United States Patent
Corbett et al.

(10) Patent No.: US 8,543,642 B2
(45) Date of Patent: Sep. 24, 2013

(54) METHOD OF OPTIMIZING DATA FLOW BETWEEN A SOFTWARE APPLICATION AND A DATABASE SERVER

(75) Inventors: Sean Corbett, London (GB); Edward Philip Edwin Elliott, West Sussex (GB); Matthew Clothier, Somerset (GB)

(73) Assignee: Data Accelerator Limited, London (GB)

( * ) Notice: Subject to any disclaimer, the term of this patent is extended or adjusted under 35 U.S.C. 154(b) by 174 days.

(21) Appl. No.: 12/862,962

(22) Filed: Aug. 25, 2010

(65) Prior Publication Data

US 2011/0208808 A1      Aug. 25, 2011

(30) Foreign Application Priority Data

Feb. 22, 2010 (GB) .................................. 1002961.9
Mar. 17, 2010 (GB) .................................. 1004449.3
Jul. 2, 2010  (GB) .................................. 1011179.7

(51) Int. Cl.
*G06F 15/16*        (2006.01)
(52) U.S. Cl.
USPC .......................................... 709/203; 709/204
(58) Field of Classification Search
USPC .................................................. 709/203, 204
See application file for complete search history.

(56) References Cited

U.S. PATENT DOCUMENTS

| | | | |
|---|---|---|---|
| 6,370,522 B1 | 4/2002 | Agarwal et al. | |
| 6,604,143 B1 | 8/2003 | Nagar et al. | |
| 6,973,477 B1 * | 12/2005 | Martino | 709/203 |
| 2002/0178161 A1 | 11/2002 | Brezin et al. | |
| 2003/0158842 A1 | 8/2003 | Levy et al. | |
| 2003/0200282 A1 | 10/2003 | Arnold et al. | |
| 2004/0243555 A1 | 12/2004 | Bolsius et al. | |
| 2004/0243799 A1 | 12/2004 | Hacigumus et al. | |
| 2008/0027999 A1 | 1/2008 | Arnold et al. | |
| 2008/0162412 A1 | 7/2008 | Ireland | |
| 2008/0244184 A1 | 10/2008 | Lewis et al. | |
| 2008/0256024 A1 | 10/2008 | Downer et al. | |
| 2009/0125500 A1 | 5/2009 | Arends et al. | |

FOREIGN PATENT DOCUMENTS

| | | |
|---|---|---|
| WO | 2005076160 | 8/2005 |
| WO | 2009/019104 A1 | 2/2009 |

OTHER PUBLICATIONS

Combined Search and Examination Report, dated Oct. 12, 2010, issued in priority Application No. GB 1011179.7.
Bowman, Ivan T. et al., "Optimization of Query Streams Using Semantic Prefetching," ACM SIGMOD/PODS Conference, pp. 179-190, Jun. 13, 2004.
International Application No. PCT/GB2011/050342, International Search Report and Written Opinion mailed May 3, 2011.
GB Application No. 1011179.7, Examination Report mailed Sep. 6, 2011.
GB Application No. 1103043.4, Combined Search and Examination Report mailed Jun. 22, 2011.

* cited by examiner

*Primary Examiner* — Adnan Mirza
(74) *Attorney, Agent, or Firm* — Sheppard Mullin Richter & Hampton LLP

(57) ABSTRACT

A method of optimizing the interaction between an application or database and a database server, comprising the steps of: (a) routing data between the application or database and the database server through an optimisation system; (b) the optimisation system analysing the data and applying rules to the data to speed up the interaction between the application or database and the database server.

57 Claims, 28 Drawing Sheets

| | Present | Data Accelerator new model |
|---|---|---|
| Purchase | One-off license purchase for most software or web 2.0 apps like Salesforce offered by subscription | New business models for traditional software. Subscription, rental, rent to own etc. |
| Deploy | CD-ROM or Download with 3rd party push deployment tools | Push or pull self service delivery of apps using Application Streaming |
| Manage | 3rd party tools to manage on-going licensing | Proactive license control and protection for piracy with world class software DRM |
| Support | Problems caused by conflicts when installing additional applications. Large amounts of regression testing required | Application Virtualization protects from application conflicts. Unique configurable virtualization ensures that the application performs like it is locally installed |
| Update | 3rd party patch management solutions required to push patch updates | Patch updates are automatically streamed to users. The patch is only deployed once and all users receive the application changes on the fly |
| Upgrade | Old version has to be removed and the new version deployed as if it were a different/new application | Updates are packaged once and then can be automatically deployed to all users with the old version automatically removed |
| Remove | Software must be manually removed and usage cannot be centrally stopped once a user's license has expired. Uninstalled applications leave many remnants behind causing the system to become cluttered and slow. | Software can be centrally removed as soon as the user's license has expired or the application is no longer needed. There are no traces of the application left behind |

FIGURE 2

|  | Mobile AppStores since C. 2000 | Web AppStores 2007 - Present | Data Accelerator AppStore 2010 - | Data Accelerator Appstore for Entreprise DB Apps 2010 - |
|---|---|---|---|---|
| Content | Large number of small low value apps | Small number of web 2.0 high value apps | Windows higher value apps | Any Windows app including Very high value DB apps |
| End Users | Consumer | SME & Enterprise Customers | SME & Enterprise Customers | SME & Enterprise Customers |
| Main Offerings | Apple iTunes for iPhone PocketGear/Handango and Getjar for white labelled AppStores | Web 2.0 apps: Collaboration, CRM, HR, ERP etc. | Stand Alone Windows Applications: Office, Photoshop, AutoCAD, CorelDraw, Sage, QuickBooks etc. | As Jukebox AppStore but with support for Database Applications that are higher value and more business critical |
| Route to Market | Handset manufacturers and Mobile Operators: Apple, Vodafone, T-Mobile, LG, HTC etc. | Normally lead by providers of hosted email – Hosters and SME Telcos: BT, 1 & 1, Fasthosts, Telefonica etc. | Providers with Web Appstores looking to go beyond web apps – Hosters and Telcos As named | Second phase to customers of Jukebox AppStore wishing to extend offering |
| Market Maturity & Size | Mature market worth $4billion in 2009 | Market has been maturing over 2008/2009, Still small | New Market – multibillion $ | New Market – multibillion $ |

FIGURE 3

|  | SME AppStore | SME AppStore with licensing | Enterprise AppStore |
| --- | --- | --- | --- |
| Offering | Take SMEs existing applications and provide them on a self-service web portal | Offer sales of additional software licenses to customer delivered over the self-service web portal. Software publishers can also offer new licensing model; e.g. Rental, Rent to Own, Try and Buy | Self-Service AppStore for Enterprises to efficiently deliver their catalogue of applications to the end users |
| Benefits to End User | Simple management of apps, license reporting, self-service, always up to date, no installation/update support overhead | Simple way to buy apps. Can go up and down with changes in the business. Move from CapEx to OpEx for software, no upgrade costs etc. | Lower costs of deployment, lower costs of support, faster deployments, greater efficiency. |
| Content | Use customers' existing software licenses | Top 20 Apps: MS Office, Adobe Creative Suite, Sage Accounts, Intuit QuickBooks etc. | Enterprises own apps |
| Data Accelerator's Product Technology | Application Jukebox Data Accelerator for DB apps Web Portal eCommerce engine Payment Processing or Telco billing integration | Application Jukebox Data Accelerator for DB apps Web Portal eCommerce engine Payment Processing or Telco billing integration | Application Jukebox Data Accelerator for DB apps Enterprise Web Portal |
| Route to Market | Hosters, ISP's and Telcos | Second phase form SME Managed Apps AppStore | System Integrators/IT services Channel |

FIGURE 4

| DAInstance4AA5888240B44 48e9E20-62A8F70CF595 | DAInstance936C4368DE18405881707 A22FDBCFE59 | DAInstance8F4AEA5AE4D544cd9 B56DF16F75639l3 | ServerTime |
|---|---|---|---|
| 1 January 2010 09:43:22.02 | 1 January 2010 09:43:22.04' | 1 January 2010 09:43:23.09 | 1 January 2010 09:43:23.10 |

FIGURE 6

METHOD OF OPTIMIZING DATA FLOW BETWEEN A SOFTWARE APPLICATION AND A DATABASE SERVER

CROSS-REFERENCE TO RELATED APPLICATIONS

This application is based on and claims priority to Great Britain Application Nos. GB 1002961.9, filed Feb. 22, 2010; GB 1004449.3, filed Mar. 17, 2010; and GB 1011179.7, filed Jul. 2, 2010, the entire contents of which are hereby fully incorporated herein by reference.

BACKGROUND OF THE INVENTION

1. Field of the Invention

The field of the invention is methods of optimizing data flow between a software application and a database server. The invention can be used in web-based applications; it allows, for example, database applications to be cloud-based, with client applications connecting to a database server over a relatively slow connection such as the public Internet.

2. Technical Background

In the early 1980's software was mostly delivered as 'pre-installed' on hardware or as 'Boxed' software to be installed from floppy disks. Slow evolution of the market saw a steady migration of delivery to CD Rom as software increased in size and complexity to a point at the beginning of the millennium whereby most software could now be delivered by download over the Internet at point of purchase. Over the last eight years further developments in adjacent technologies have heralded the arrival of mobile phone application stores (AppStores) which not only successfully gave consumers new ways to purchase applications (e.g. 'try and buy') but also educated the wider market in general about different ways of buying, storing and managing applications as diverse as games and applications for business.

3. Discussion of Related Art

Over the last 3 years especially, new developments have seen a trend whereby providers of businesses services (Hosters, Telcos etc.) are offering web 2.0 application stores to their existing small and medium enterprises (SME) customers. This is a natural progression as they have moved from core competences, such as hosting, to managing email and desktop services on behalf of their clients.

SUMMARY OF THE INVENTION

According to a first aspect of the invention, there is provided a method of optimizing the interaction between an application or database and a database server, comprising the steps of:

(a) routing data between the application or database and the database server through an optimisation system;

(b) the optimisation system analysing the data and applying rules to the data to speed up the interaction between the application or database and the database server.

The method may be one in which the optimisation system enables the interaction between the application/database and the database server to be sufficiently optimised to enable a practical connection to be made over a slow or high latency link such as the Internet. The optimisation system may, for example, reduce the amount of processing or operations to be performed by the server. The optimisation system may also reduce the amount of data needed to pass between the client application and the database server. The interaction between the application or database and the database server may include any one or more of the following: the flow of data, the cessation of the flow of data, obviating the need for data to flow, or managing the flow of data.

An implementation, called Data Accelerator, from Data Accelerator Limited, includes one or more of the following features:

the database server is cloud-based, or on a local network, or on a WAN or if the DB server is local to the application.

the application or database is deployed, managed or updated to end-users using application virtualisation software.

allows the number of database servers, or the load on the or each database server required, to be reduced.

allows the load on the or each database server to be balanced or redirected in cases of fail-over.

the optimisation system is added to an existing database client application or database server, and the structure of the tables and/or files of the database running on the database server, are each substantially unchanged by the optimisation system.

the optimisation system is not an integral part of the client application or the database server or bespoke coding to the client application or the database server.

the optimisation system changes either the application/database or the database server, but not both.

the optimisation system is implemented in software and includes a client application or a server application.

the optimisation system is implemented in software and includes a client application and a server application.

the optimisation system is implemented in hardware.

the optimisation system is located between the application/database and the database server.

the optimisation system is located on the application/database and/or the database server.

the optimisation system includes multiple instances of individual optimisation systems that each provides optimisation services.

the multiple instances include a chain or mesh of peers.

the path through the multiple instances of individual optimisation systems is variable.

the multiple instances of individual optimisation systems are able to communicate amongst themselves.

the multiple instances of individual optimisation systems share diagnostics and performance information.

the multiple instances of individual optimisation systems each understand where they are in the chain or mesh of peers between initiator and the server.

the optimisation system can dynamically determine how effective or detrimental a specific rule is and can choose to vary the applied rules to find the optimum performance enhancement.

the server is a SQL server.

the data includes DBMS (Database Management System) requests and responses.

the optimisation system reduces the number of DBMS requests and/or responses.

the rules are accessed through a rules engine.

the rules engine decides when and how to apply rules.

the rules define caching of queries.

the rules define how to obtain diagnostic, performance, cached data, cachability information.

the rules define how to configure other rules.

the rules define peer to peer caching of queries.

the rules define compression.

the rules define encryption.

the rules define predictive pre-fetching.

the rules define string replacement.

the rules define query batching.

the rules define re-routing to specific database servers for load balancing or fail-over.

the rules define request modification.

the rules pre-validate requests.

the rules define auditing and logging.

the rules automatically tune, adapt or improve.

the rules can be selectively enabled or disabled based on factors such as initiator and server addresses or locations, time of day, configuration, server load.

the rules are applied at different points in the request/response stream.

the rules are custom rules.

According to a second aspect of the invention, there is provided a method of distributing software applications, comprising the steps of:

(a) providing multiple software applications accessible in an application store;

(b) routing data between one or more of the software applications and a database server, via a WAN such as the Internet, and through a data optimisation system that applies rules to speed up the interaction between the or each software application and the database server.

In this second aspect, the software applications may include database client applications and may be distributed to end users' PCs; the software applications may also be distributed to system integrators.

The database server may be cloud-based. The software applications may be deployed, managed or updated to end-users using application virtualisation software.

According to a third aspect of the invention, there is provided a computer system including:

(a) a remotely accessible database server (b) an application or database connected over a network to the database server, and (c) an optimisation system in which the optimisation system analyses data requests from the application or database and applies rules to the data to speed up the interaction between the application or database and the database server.

According to a fourth aspect of the invention, there is provided computer readable media storing software defining an optimisation system to optimize the flow of data between an application or database and a database server, the optimisation system being operable to analyse the data and apply rules to the data to speed up the interaction between the application or database and the database server.

According to a fifth aspect of the invention, there is provided a method of optimizing the interaction between a file requestor and a file server, comprising the steps of:

(a) routing data between the file requestor and the file server through an optimisation system;

(b) the optimisation system analysing the data and applying rules to the data to speed up the interaction between the file requestor and the file server.

According to a sixth aspect of the invention, there is provided a method of optimizing the interaction between a web data requestor and a web server, comprising the steps of:

(a) routing data between the web data requestor and the web server through an optimisation system;

(b) the optimisation system analysing the data and applying rules to the data to speed up the interaction between the web data requestor and the web server.

Benefits of the Data Accelerator Implementation

Reduced Number or DBMS Servers for an Enterprise

The main benefit to an organisation is that when a DBMS request is sent, it can be served faster and more efficiently with as minimal impact or load on the actual DBMS as possible. The reason that the load on the DBMS needs to be minimised is that they are traditionally expensive systems to operate, either through licensing or the hardware that is required in order that the responses can be served quickly enough. By minimising load, Data Accelerator can lead to a significant reduction in the number of DBMS servers that an organization needs to run and can therefore lead to a significant reduction in both costs and the environmental impact of running those servers.

Data Base in the Cloud or Database as a Service

The second main benefit is because of the extra work that goes on at the network (and/or client) level like caching, compression or string replacement, it is now possible to locate the DBMS system over a slow link, either a secured link to another site or over the internet to a cloud. Because of the nature of the environment, the DBMS system can be scaled cheaply. With the network optimization that Data Accelerator carries out, moving DBMS systems into the cloud can be made a reality for both new and legacy systems.

BRIEF DESCRIPTION OF THE DRAWINGS

FIG. 2 shows areas impacted by changes in a software life cycle, contrasting known approaches with that possible using an implementation of the invention.

FIG. 3 shows new delivery models emerging and Data Accelerator's proposition.

FIG. 4 shows Data Accelerator's Product Offering to service the markets.

FIG. 6 shows a response data set.

DETAILED DESCRIPTION

Section A: Overview

Figure 1:
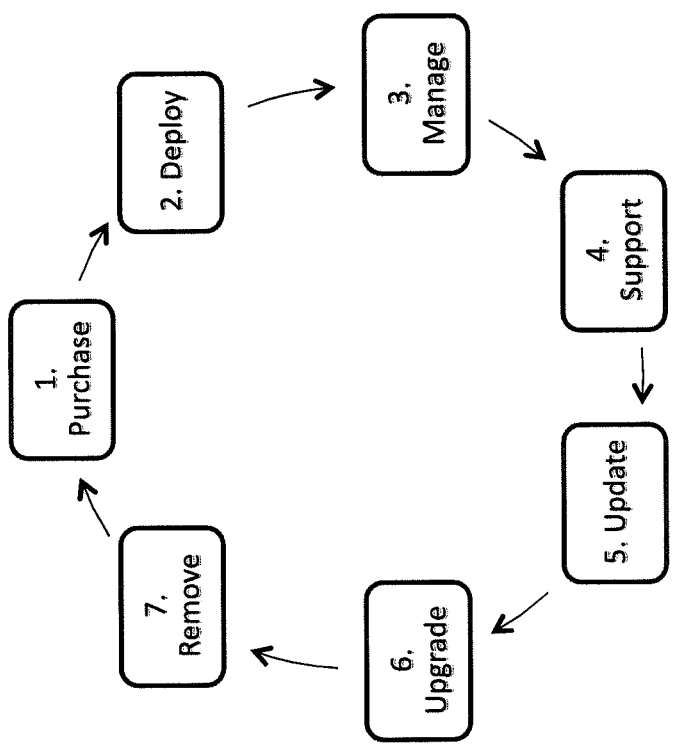
FIG. 1 shows areas impacted by changes in a software life cycle.

A problem facing current DB based apps is that they are written on the assumption that the client is on the same LAN as the DB. Because the LAN is assumed to be fast, there is no optimization of the data traffic. But many people now want to deliver their DB apps over the internet, with their DB servers somewhere in the cloud. Software as Service apps all require this, for example. But a DB app, designed for a server and client talking to each other over a high bandwidth LAN, will be very slow when working over the internet.

The conventional solution is to analyse the traffic between client and server and get rid of bottlenecks using bespoke coding. But that is costly.

One of the broad ideas in Data Accelerator is to re-direct traffic between a client and DB (e.g. SQL) server so that the traffic passes between a small app on the client and a server component that is on a LAN with the DB server. The small app and the server component apply traffic optimization and traffic shaping. This should yield a generic solution that can retro-fit to any legacy DB that needs to migrate to the cloud or deliver software as a service.

Four core technologies are used by the small app on the client and a server component:

1. Compression and encryption
2. Caching data on each client, with peer to peer transfer of cached data between clients. The DB side Server Component maps out which clients are on the network and what data they each cache and can hence restrict itself to delivering just deltas to clients as needed. It can also trigger the peer to peer transfer of data between clients—many of which will be on the same fast LAN.
3. Predictive pre-caching in which the Server Component understands the likely flow of client side interactions and can hence predict what data the client is likely to request and can then send it in advance to the client side cache. This is an adaptive process, learning incrementally, for each application, the likely interaction flow by monitoring actual useage.
4. SQL (or other DB) string replacement by indexing lengthy strings with compact references. The Server Component dynamically learns what SQL strings are being used frequently and can then tell the client to stop using specific full strings and instead start using a compact reference. When the client adopts that compact reference, the server component can then interpret it correctly.

Here these technologies are used individually or collectively in the context of re-directing traffic between a client and DB (e.g. SQL) server so that the traffic passes between a small app on the client and a server component that can apply traffic optimization and traffic shaping.

The present invention is implemented in a system from Data Accelerator Limited: Data Accelerator is pioneering a new paradigm of software delivery and management that will go further than any that exist today. Data Accelerator's solution will permit businesses to purchase not just the limited selection of web 2.0 applications currently available, but to have an AppStore for any kind of business, conceivably delivering ALL of the applications needed by a business to run a business, including database applications. The benefits, which are explained below, are far-reaching and fundamental, going beyond the point of increased efficiencies in initial purchase and delivery. Achieving this goal, particularly if a relatively slow (e.g. under 5 MB per second) network is used, requires new ways of optimising the flow of data across the network—for example across the network that links a database client application obtained from the App Store and the database server for that application.

One of the key reasons businesses have moved to buying from web AppStores, is for the simplicity of both purchase and deployment, auditing and updating. But critically, with the implementation of application virtualisation, they are doing so to reduce the cost of the ongoing day to day management of these applications on the desk-top, even more so for very large enterprises. Now, by enabling all of their business applications, including those that are not web 2.0 apps, to be delivered through web stores and streamed from centrally hosted databases, businesses can get all of the benefits associated with web 2.0 applications for the rest of their inventory of software. This has a huge impact for almost any company's entire legacy IT infrastructure. The areas most impacted by these changes in a software life cycle may be those shown in FIG. 1 and in FIG. 2. FIG. 2 contrasts the present approach to that possible with Data Accelerator's approach for each step in the lifecycle.

What will Data Accelerator Offer the Market?

Data Accelerator's AppStore will enable any application, including even database applications, to be delivered over the Internet giving users access to their applications and their data on any Internet connection from any computer. For small, medium and large enterprises this transition provides an enormous cost reduction on their existing technology infrastructure and significantly increases the productivity of their users. (For the purpose of broad definition, an SME will typically use a publically run AppStore and hosting in public cloud, whilst an enterprise will typically use an internal privately run AppStore and private cloud).

With reference to FIG. 3, the new delivery models emerging are shown in the columns headed "Mobile AppStores since C. 2000" and "Web AppStores 2007-Present", and Data Accelerator's proposition is shown in the columns headed "Data Accelerator AppStore 2010" and "Data Accelerator Appstore for Entreprise DB Apps 2010" of the Table.

In FIG. 4, Data Accelerator's Product Offering to service the markets is identified in the Table. Key to a business oriented AppStore is the provision of database applications. In the past, database applications have required a high bandwidth (e.g. over 5 MB per second) LAN linking a powerful server with multiple client computers. That approach is however not relevant to database applications bought from an AppStore since those database applications will typically have to operate efficiently over a relatively slow connection such as the internet or wireless connectivity such as GPRS. How are we Doing This?

Data Accelerator Limited is developing its own proprietary technology, Data Accelerator, for accelerating and optimizing the flow of data between any application and a database server. Specifically the solution will enable practical access to a database application across a wide area network (WAN) or the Internet that is not currently possible or is prohibitively slow at present. Data Accelerator is the only known product of its type. Data Accelerator may also make use of a leading technology in application virtualisation, such as Application Jukebox from Endeavors Technolgies of Irvine, Calif. Together with Data Accelerator this will create the first of its kind in a data flow optimization model that works for the cloud, capitalising on and meeting three principal global market opportunities:

1. A PC application store for any Windows application.

This SME based offering will be targeted at telephone company (Telco) operators, hardware vendors, retailers and Independent Software Vendors (ISVs) to re-sell to their end users. On top of streaming applications to users moreover, we have the added advantage of being able to deliver and store end-user data in the public or private cloud because of Data Accelerator (explained below).

2. A private application store for enterprises targeted at system integrators to resell to their customers, managed centrally from a private or public cloud.

Data Accelerator's solution will aid the sales process and return on investment (ROI) of a system integrator's own products or services, especially where they are managing desk-tops, by reducing the cost and complexity of delivering applications to enterprise users and the overheads of administering and paying for expensive server set-ups.

3. An independent App Store targeted at Independent Software Vendors (ISVs) for new and existing markets.

Those ISV's that have a database back end on their application will normally suffer from complex and long sales cycles and high costs of implementation as each time they sell their software their customer also has to make an additional investment in the database infrastructure to support the application.

If the ISV uses Data Accelerator however, they can run a central hosted database in the Cloud for their customers to use. This is delivered at a much lower cost to the end customer due to economies of scale and it means that the ISV only has to focus on selling the benefits of their software. Then the ISV can use an application virtualisation technology, such as Application Jukebox, to deploy their client software and updates to the customer over a WAN. This gives complete control over licensing to the ISV and it means that there is a very simple implementation process for the customer with a lower Total Cost of Ownership.

A hypothetical, fictional example of an ISV that has this kind of problem is Bert's Glasses, which supplies replacement car windsceens. A significant part of their business involves gathering data on vehicles and then making that available to car traders, insurers and car repair centres. The software they provide for car repair centres is called Glassbert and has a client application and a back end database that stores the car repair costing data for quoting to insurers. This application is not appropriate to become a web-based application due to the need to communicate with local large files, such as photos of the repairs themselves. Currently Bert's Glasses requires each customer to install and maintain their own SQL (Structured Query Language) server at each customer office. This presents a large problem for them during the sales cycle to a new customer since car repair centres have little or no information technology (IT) knowledge and to maintain such a server in each office costs around GBP 1,000 a year for a small SQL server. Also, the current set-up makes updating the data a very complex and expensive process involving sending out a CD ROM to 1,000 customers every month to update the database. Bert's Glasses have previously investigated providing a central database for their customers and know that this would reduce their sales cycle and significantly reduce their costs of updating and supporting those customers. However their investigations correctly found that the database would be too slow to be used over a WAN (either a virtual private network (VPN) or internet) so the only option would be to use Citrix XenApp (Presentation Server) to serve the application remotely. This would be prohibitively expensive for them and add around GBP 600 per user to the cost of their application. Given that Bert's Glasses has 1,000 customers with approximately 10,000 users each charged GBP 1000 per year, this is over a 50% increase in the cost of implementing such a solution—many GBP millions.

The other area where Data Accelerator can help ISVs is if they have a web-based application. Any web-based application has a back end database and as the ISV scales up the number of users they also have to scale up the database infrastructure; this comes at a cost that can be very high.

Data Accelerator can be used to scale the number of users that can use a web based application without needing to increase the number of database servers. This can reduce the cost for the ISV and improve the performance of the web application for the user.

Section B: Data Accelerator

What Does it Do?

Data Accelerator optimizes data traffic between an SQL Server and any client application.

How will it Work?

The Data Accelerator data flow optimisation system will analyse the specific SQL traffic and perform various proprietary optimization techniques to reduce the amount of information sent to the SQL server and the amount of processing required of that server. Furthermore, Data Accelerator is a totally transparent solution that can be retrofitted on any database application to improve speed of response times and overall query performance over a WAN. This significantly increases the size of the addressable market. An added benefit in terms of ease of adoption is that Data Accelerator and application virtualisation software, such as Application Jukebox, can be implemented incrementally rather than a wholesale replacement of systems and methods at a huge cost, e.g. Virtual Desktop Infrastructures (VDI).

What Does this Mean for Enterprises?

Reduced Number of DBMS (Database Management Servers) for an Enterprise

The main benefit to an organisation is that when a DBMS request is sent, it can be served faster and more efficiently with minimal impact or load on the actual DBMS. The reason that the load on the DBMS needs to be minimised is that they are traditionally expensive systems to operate, either through licensing or the hardware that is required in order that the responses can be served quickly enough. With Data Accelerator we can, in one variant, use the far cheaper and more abundant processing power of the users' PC (e.g. the optimisation system can include a client component running on client PCs, taking advantage of the computational power of those PCs). By minimising load, Data Accelerator can lead to a significant reduction in the number of DBMS servers that an organization needs to run leading to a significant reduction in both costs and the environmental impact of running those servers.

Databases in the Cloud or Database as a Service

The second main benefit is because of the improvements that Data Accelerator gives at the network level (such as caching, compression or string replacement) it is now possible to locate the DBMS system over a slow link, either a secured link to another site, a VPN or over the internet to a cloud. Because of the nature of the environment, the DBMS system can be scaled cheaply. With the network optimization that Data Accelerator achieves, moving DBMS systems into the cloud can be made a reality for both new and legacy systems.

How is the Benefit Measured?

The benefit will depend on the application itself but in the real world would allow a financial application that would normally takes a user 10 minutes to log into over the internet using conventional techniques to be reduced to a few seconds or allow a large enterprise to reduce their number of severs by up to 10 times. With each customer, the exact saving will be accurately demonstrable with live data feedback that can measure and quantify the saving and efficiency benefit on each application for every client in real time. Because Server Virtualisation only reduces the number of physical hardware boxes but not the amount of computing power required, the benefits accruing through Data Accelerator will be a much greater improvement. Server Virtualisation has swept the market over the last 5 years, hence the growth of VMware and Citrix, showing us the potential of the market for fast adoption.

Where and How will it be Applied and Installed?

The server software will be a standalone application that can be installed on either the SQL server or any other server on the same local area network (LAN) segment of the SQL Server. The client side will be able to be installed as an application or as a client install on each PC, or a combination of both. The client will be installable in user mode, meaning without the requirement for Administrator rights on the end PC. IT departments will of course also be able to use Data Accelerator for all their corporate database applications to improve performance, extending the use of applications to home users and branch offices and reduce the costs of their server infrastructure or in fact to any employee who needs to be mobile.

What Techniques lie Behind the Implementation of the Invention?

The SQL data will be cached and we are developing techniques to automatically pre-fetch the subsequent SQL data that is needed for any given application query. When responding to a query, the client will get the results from a local client's cache if available and only the differential will be sent over the WAN. The key part of this method is that the SQL server and application will not be aware of the optimization taking place. Data Accelerator is a totally transparent solution that can be retrofitted on any database application to improve speed of response times and overall query performance over a WAN. This of course massively increases our addressable market since it will be applicable to all historic database applications currently running. It achieves this by rerouting the SQL traffic that normally flows directly between the client application and the SQL server. With Data Accelerator now the SQL traffic flows via our additional client and server application so that we can dynamically add in optimization techniques to the communication.

Figure 5:
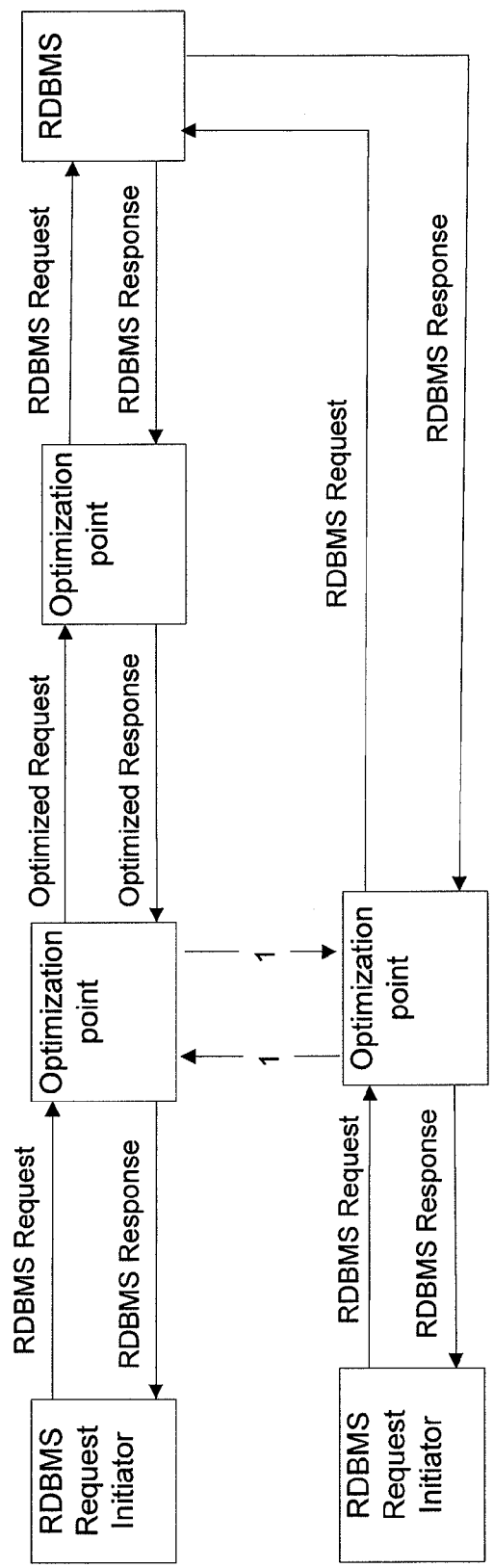
FIG. 5 shows how the data optimization services can interact with other services, initiators and DBMS (database management system) servers. RDBMS is Relational DBMS.

The diagrammatic example of FIG. 5 shows how the data optimization services can interact with other services, initiators and DBMS servers: the optimization servers are labelled in FIG. 5 as 'Optimization Points'.

There will be four main optimization techniques used on the SQL traffic and these will improve over time. These are:
Peer to Peer Caching of queries
Compressions and Encryption
Predictive Pre-fetching
String replacement
How will it Improve Over Time?

The initial release will contain the framework and rules to accelerate database connection but it will have to be manually configured to a specific application. The following releases will allow the acceleration (i.e. the applicable optimisation rules) to automatically adapt, improve and/or tune itself to any application. Subsequent releases will also use the network effect data (the aggregated data from all customers) that is generated from the users of the application to help us further improve the acceleration.

Section C: Application Juke Box

What Does it do?

Application Jukebox streams applications or any files to a Windows desktop from a server with central control and management over the application and its license. Once the application is on the users' desktop, it is virtualized, meaning only the parts of it required to work while running the application are temporarily available and therefore there are restrictions to stop the application from conflicting with other applications on the desktop, thus preventing support issues. Also, this protects the software from piracy.

Why do we Need it?

Using Data Accelerator to centralise the database or move it into the cloud, removes the requirement for onsite database servers and onsite support for those servers. Combining this with application virtualisation like Application Jukebox also allows the client application to be managed and supported centrally rather than onsite. Thus the combined benefit allows a total centrally managed solution thereby giving reduction in cost and increased productivity.

Application Jukebox

The product gives the good control mechanisms for the virtualised delivery of an application as well as a flexible combination of Integrated or Isolated Virtualisation capabilities. It has Digital Rights Management for preventing piracy and controlling billing and the use of the application, which in turn enables us to have innovative new revenue models and safely enter emerging markets.

How will Application Jukebox be Integrated with Data Accelerator?

Application Jukebox is used for delivering the binary files for applications or data while Data Accelerator is used for the transfer of structured information between an application and its database. The integration of these products will allow any type of application to be delivered and for users to be able to access the back end data for the application.

Section D: More Technical Detail

Data Accelerator is a system that intercepts requests that are being sent to a relational database, decomposing the request in order to understand the request and applying a set of rules in order to improve the performance of the request. This can be applied to any Relational Database Management System (DBMS) database system. It enables, for example, legacy DBMS platforms to be migrated efficiently to cloud-based operation.

A set of rules can be applied to optimize the request so that the initiator of the request gets the results as quickly as possible. The present implementation of the invention is predicated on the fact that requests sent to a DBMS are often unnecessary duplicates, the requests often return a large amount of data that may or may not be actually used and the DBMS systems do not take into account external factors such as the performance of the network, the load on the DBMS and whether the client already has some or all the data it needs to fulfil the request. Instead of getting the DBMS system to run every request, an implementation of the invention can for example analyse the request and decide on a course of action that can either avoid having the DBMS re-run the query, thereby saving the time it takes to execute the query and the time it takes to transfer over the network, or it can alter the request and/or the response in order to serve the response more efficiently. We will refer to this as an optimization system, optimization server or optimization point. These optimization systems can be implemented in hardware, software, or a combination: for example, they may be implemented in a computer running appropriate software; the computer is located between the initiator and the DBMS. Similarly, they may form part of the DBMS, for example being part of the software controlling the DBMS, or be part of the software running on the initiator's computer. Or they may be distributed across the DBMS, the initiators' computers, or one or more intermediary servers. In each case, the existing client application (running on the initiator's computers) and the server (the DBMS) are substantially unchanged by the optimisation system; this is very different from conventional and costly bespoke coding approaches to data flow optimisation.

Multiple implementations of the invention (each providing optimization services) may (optionally) be used at different network points between the initiator of the request and the DBMS. When routing is done between two or more of the systems that each provide optimization services, then these systems (i.e. optimization systems) can include additional information either in or around the request for upstream or downstream optimization services in order to learn more about the request and responses so that they can understand the effectiveness of any rule applied and also offer other guidance about results of the optimization and possible further optimizations.

When there are other versions of the optimization services running which are not in the direct path between the initiator and the DBMS, such as separate clients on a peer-to-peer network, then they may optionally also share both request and response data as well as information to learn about the effective methods of optimizations described above. Rules can be selectively enabled or disabled based on a number of factors such as initiator and DBMS addresses, the locations, time of day, configuration or other methods such as server load. An example of how the optimization services can interact with other services, initiators and DBMS servers is shown in FIG. 5: the optimization servers are labelled in FIG. 5 as 'Optimization Points'.

DETAILED DESCRIPTION OF THE PREFERRED IMPLEMENTATION

Figure 7:
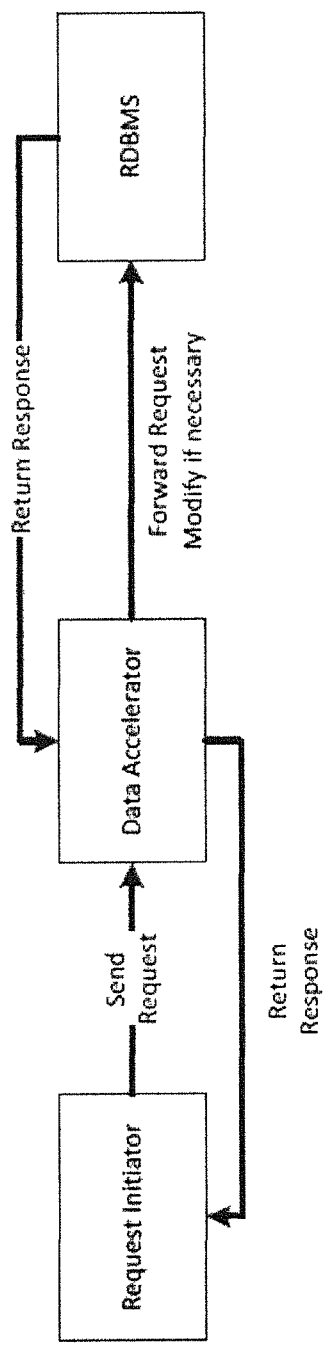
FIG. 7 is a schematic of the approach where the rules have not been able to stop the request from being sent to the DBMS so the request is forwarded.
Figure 8:
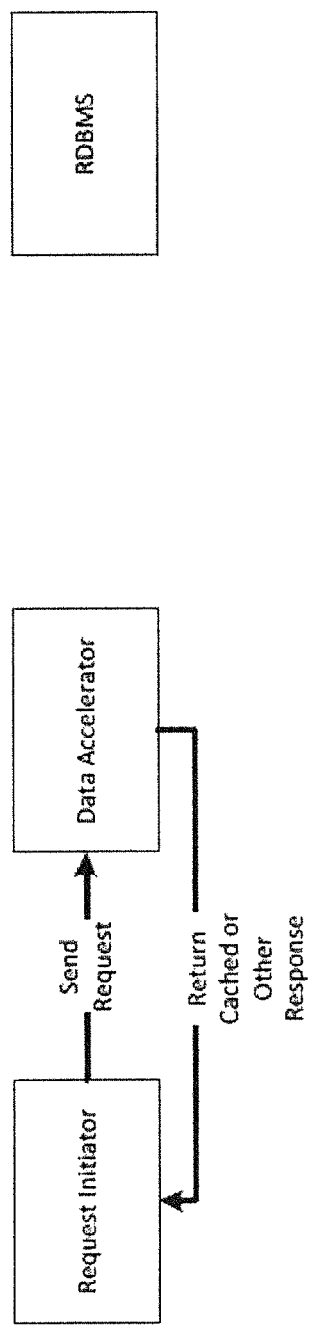
FIG. 8 shows the response is able to be served directly from the Data Accelerator optimization server and the DBMS system does not need to do anything.

Data Accelerator provides the interception, analysis and database traffic optimization described in the preceding sections. To re-cap on the fundamentals, the traditional approach for database systems (DBMS) is for the initiator of a request to send every request to a DBMS and for that system to run every single request. In one example, the present implementation of the invention challenges this orthodoxy by requiring that the requests and responses have rules applied to them to limit what is actually run on the DBMS, running queries more intelligently and making better use of network bandwidth to improve performance for users of DBMS systems. The example of the approach can be summarised as intelligently "intercept and analyse then respond, change or ignore" at the Data Accelerator optimization server. FIG. 7 is a schematic of the approach where the rules have not been able to stop the request from being sent to the DBMS so the request is forwarded. FIG. 8 shows the response is able to be served directly from the Data Accelerator optimization server and the DBMS system does not need to do anything. Typically the responsiveness of a DBMS system is affected by a number of factors such as, query compilation, load, data access (reading and writing to disks) and network response time. By using a rules based framework that is able to intelligently learn how to apply the rules to give the maximum performance benefit, significant savings can be made whilst still having a scalable DBMS architecture.

Figure 9:
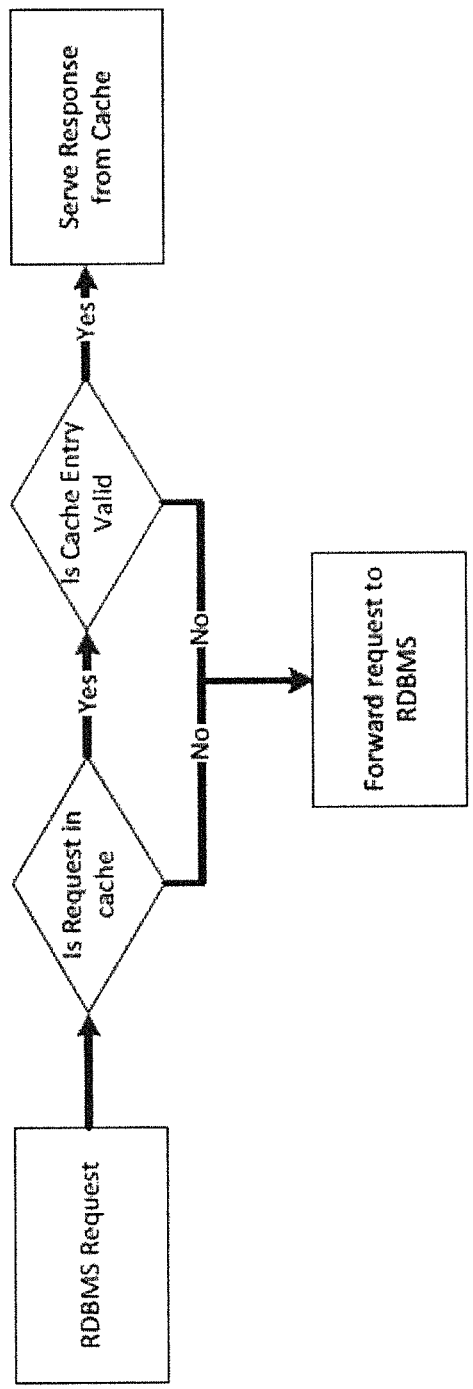
FIG. 9 shows caching of request and response data, to return the response direct from a cache without having to run the request on the DBMS.

The Data Accelerator can apply many different kinds of rules, such as any one or more of the rules in this non-exhaustive list:

Caching of request and response data, to return the response direct from a cache without having to run the request on the DBMS—see FIG. 9.

Pre-Caching of requests can take place so when a request has been seen before with other requests, those other requests can be sent to the DBMS so when the initiator requires them, they are available immediately.

Figure 10:
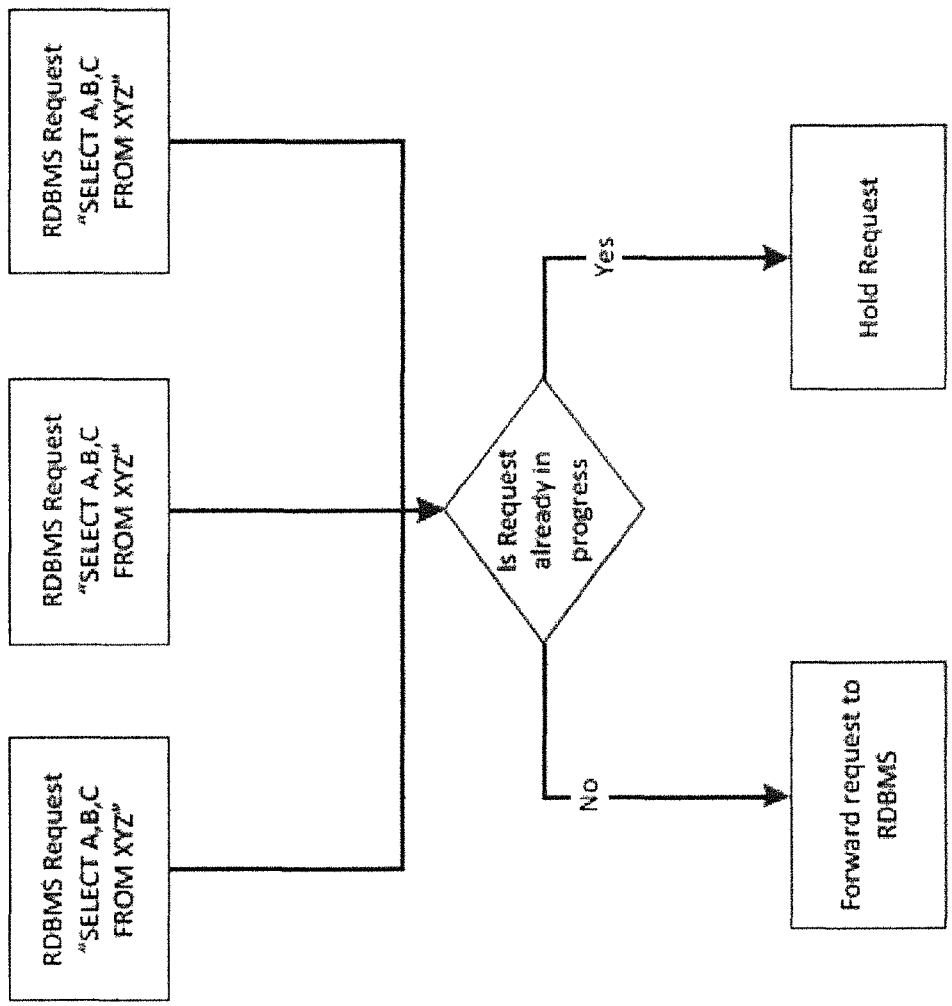
FIG. 10 shows Query Batching i.e. duplicate queries which have been requested at the same time can be stopped because the first request can be run while the duplicates are held, when the response to the first one is sent, it can be sent to all of the initiators; this Figure shows the requests being held.
Figure 11:
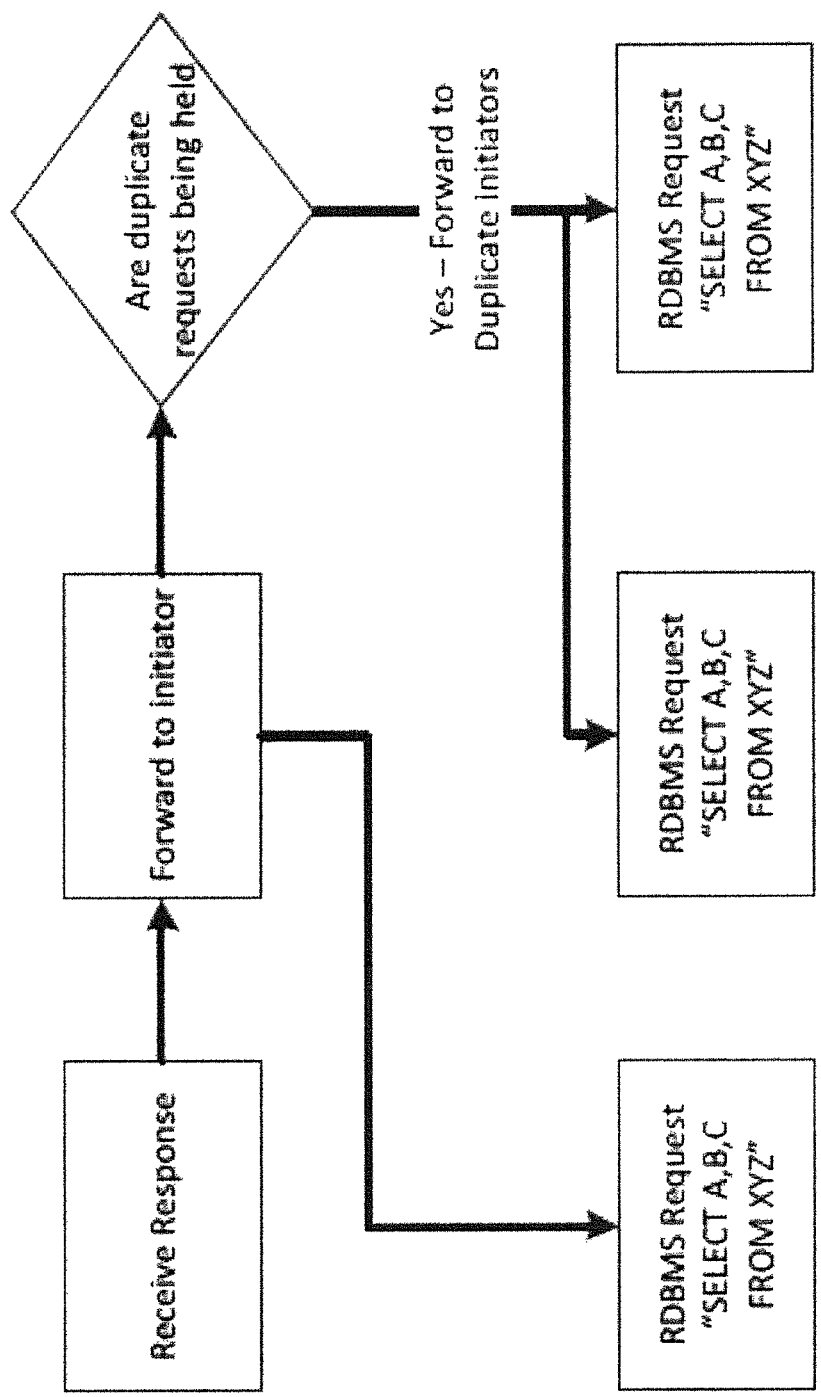
FIG. 11 shows Query Batching i.e. duplicate queries which have been requested at the same time can be stopped because the first request can be run while the duplicates are held, when the response to the first one is sent, it can be sent to all of the initiators; this Figure shows the response being served to multiple initiators.

Query Batching i.e. duplicate queries which have been requested at the same time can be stopped because the first request can be run while the duplicates are held, when the response to the first one is sent, it can be sent to all of the initiators. See FIG. 10 which shows the requests being held and FIG. 11 which shows the response being served to multiple initiators.

Compression of the request and/or the response which will decrease the time it takes to send the actual data over the network.

Replacement of common strings to minimise the data travelling over the network.

Re-Routing of requests to separate specific DBMS systems to provide a load balancing feature Re-Routing of requests over separate specific network paths depending on which one is online and fastest.

Request modification which will modify queries to only request the data that is required, for example adding a TOP X clause to a query that only requires a certain amount of data but requests more than it needs.

Pre-Validating the request for errors such as incorrect syntax of the query language being used or for security issues, so these can be failed before even having to get the DBMS to fail the request.

To address issues such as auditing and logging, a rule can be put in place to call the auditing or logging systems so that these can still be used.

To address issues such as security over WAN links a rule can be put in place to encrypt the traffic between two Data Accelerator instances.

These and other rules give numerous advantages over the existing method of having a DBMS run each and every request that it receives, the specific advantages include:

Lowering the actual cost and ownership cost of high performance DBMS systems, notably:

The cost of having to have additional and more powerful hardware.

The power costs associated with more physical servers and more powerful servers.

The personnel cost of having to maintain the equipment and keep it running optimally Typically with DBMS systems, because of the amount of data that is transferred over the network, using a wide area link to connect to the DBMS is not possible, however using the Data Accelerator you can host your DBMS system anywhere in the world.

As the Data Accelerator reduces the amount of requests being sent to the DBMS, the requests that it does have to deal with get more resources to complete in a more efficient manner, so even queries that cannot be helped by the rules framework will still complete faster.

Some examples should help to show how wasteful traditional systems are and how they can be optimized. The first example is of a national healthcare provider who without Data Accelerator would have to either host their DBMS in one location and use an expensive remote virtualization solution or have a DBMS in each branch office and replicate data around between branches which can be inefficient, prone to failure and expensive. Using the present implementation of the invention they can connect directly from each client via a local Data Accelerator instance, which applies any caching and pre-caching rules it can or compresses and encrypts all traffic connecting over the WAN to the Data Accelerator instance at the DBMS site where it is uncompressed and unencrypted and forwarded onto the DBMS. The response is similarly compressed and encrypted before sending back.

The benefit of this approach is that the healthcare provider simply needs one site which keeps costs low whilst still getting the performance they need. Typically when a patient goes to reception their details are first loaded so the receptionist's traffic can be prioritised by the Data Accelerator, as the data that is required is common i.e. there are a number of requests which get the patient records (e.g. names, address, date of birth etc.) the pre-caching can have a massive benefit. As the patient moves to the specific department, the information is already available at the local cache so it can be served immediately. This shows a situation where the Data Accelerator can be used where imperfect solutions were previously used.

The second example is of a global insurance company which has a number of reports showing the daily claims and policy sales data which are run by various levels of management every day. By using the Data Accelerator they are able to drastically reduce the amount of processing that the DBMS system needs to do during the online day so it can be used for other processing or a cheaper system can be put in place. The hierarchy of managers who view the reports are:

1×Global Director
5×Regional Directors
50×Country Managers—Each region has an average of 10 countries
2500×District Managers—Each Country has an average of 50 districts There is one report for each manager so the global director has a global report, regional directors have a report and each country manager has their own report etc. A report consists of one DBMS request. Typically each person views their own report, their peers reports (district managers peers are those in their country and not in all countries) and also their direct subordinates.

The data is refreshed once overnight and without the present implementation of the invention and request caching the amount of requests the DBMS needs to cope with is:

Global Director=6 Reports—1 Global Report and 5 Regional Reports
Regional Directors=275 Reports—Each regional director views the 5 regional reports and their own countries reports
County Managers=27500 Reports—Each country manager views all 50 country reports and their own districts
District Managers=25000 Reports—Each district manager views their own reports and all the districts in their own country
Total Requests=52781

If however we use caching, so that reports are only run once, then we simply count the number of reports that are available:

1 Global Report
5 Regional Reports
50 Country Reports
500 District Reports
Total Requests=556

That is 1.053% of the number of original requests. Because the same reports are run every day, once the data has been refreshed the Data Accelerator can employ pre-caching to generate the data the reports require before anyone has even requested the first report. Deploying this for enterprise reporting solutions often means that it is possible to restrict the use of complicated and expensive pre-aggregating solutions such as online analytical processing (OLAP) cubes.

For a final example we can take a look at a web site which shows dynamic pages directly from a DBMS system. The site is 24/7 and has pages modified by editors as well as data feeds constantly updating pages. By using the Data Accelerator they are able to improve the performance of the site and ensure that the resources needed to serve the site are reduced so the running costs are cheaper.

A page consists of, a site header, site footer, a site tree and the page itself where each item is a separate DBMS request. On average:

1 Page every 5 minutes is added or deleted which changes the site tree
The header or footer are changed once every 7 days
The site receives 50 page views a minute The situation without Data Accelerator is that the DBMS handles 2,000 requests/minute which are:

50×Site Tree
50×Site Header
50×Site Footer
50×Pages

This equates to 12,000 requests per hour, 288,000 per day and 2,016,000 requests a week.

Using Data Accelerator, depending on which pages are shown, in the worst case scenario, where the page requested is always the page that has been modified there is still a massive reduction in requests:

1×Site Tree—every 5 minutes
1×Site Header—every 7 days
1×Site Footer—every 7 days
1×Page—every 5 minutes (if the changed page is not requested then this can be even lower)

This equates to 12 requests per hour, 288 requests per day and 2,018 DBMS requests every week. This is a reduction in the worst case scenario to 0.1% of the original requests.

Figure 12:
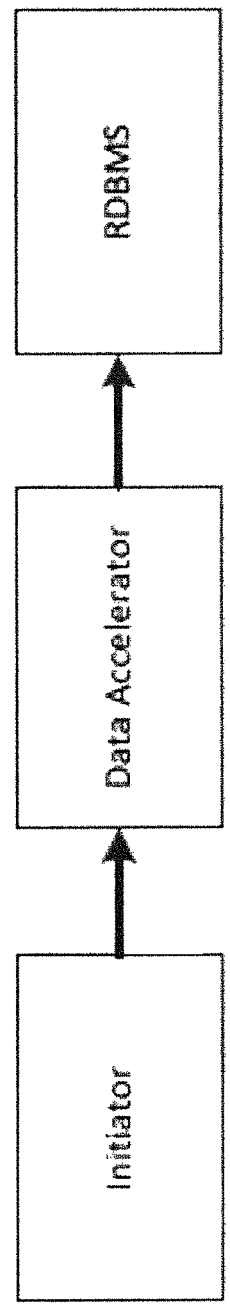
FIG. 12 shows a single Data Accelerator instance.
Figure 13:
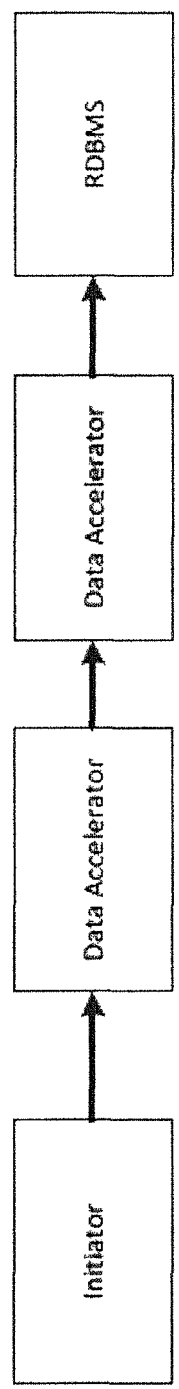
FIG. 13 shows two Data Accelerator Instances.
Figure 14:
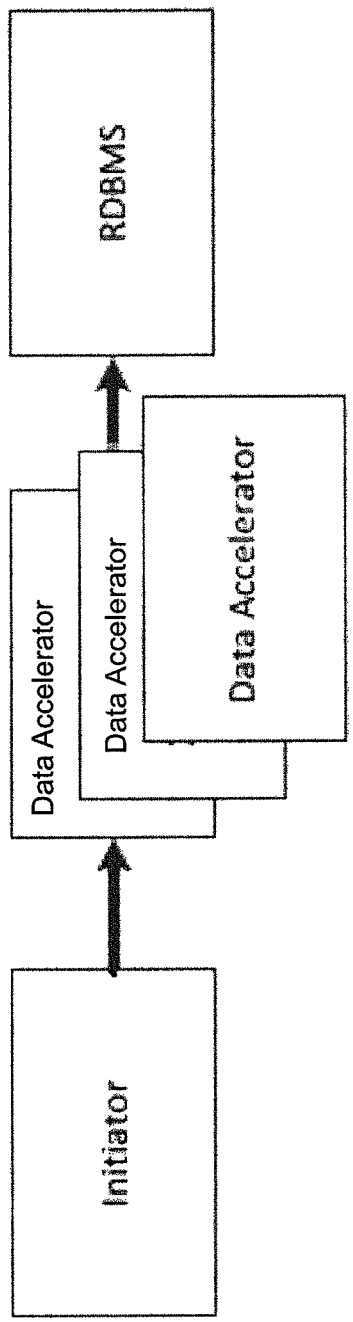
FIG. 14 shows multiple Data Accelerator instances.

The Data Accelerator optimisation system can work as either the only instance between an initiator and an DBMS or as part of a chain involving two or more instances; using multiple instances allows rules to do things to the request that they could not otherwise (compress, encrypt etc.) and share diagnostics and performance information between the instances. FIG. 12 shows a single Data Accelerator instance, FIG. 13 shows two Data Accelerator Instances and FIG. 14 shows multiple instances.

Figure 15:
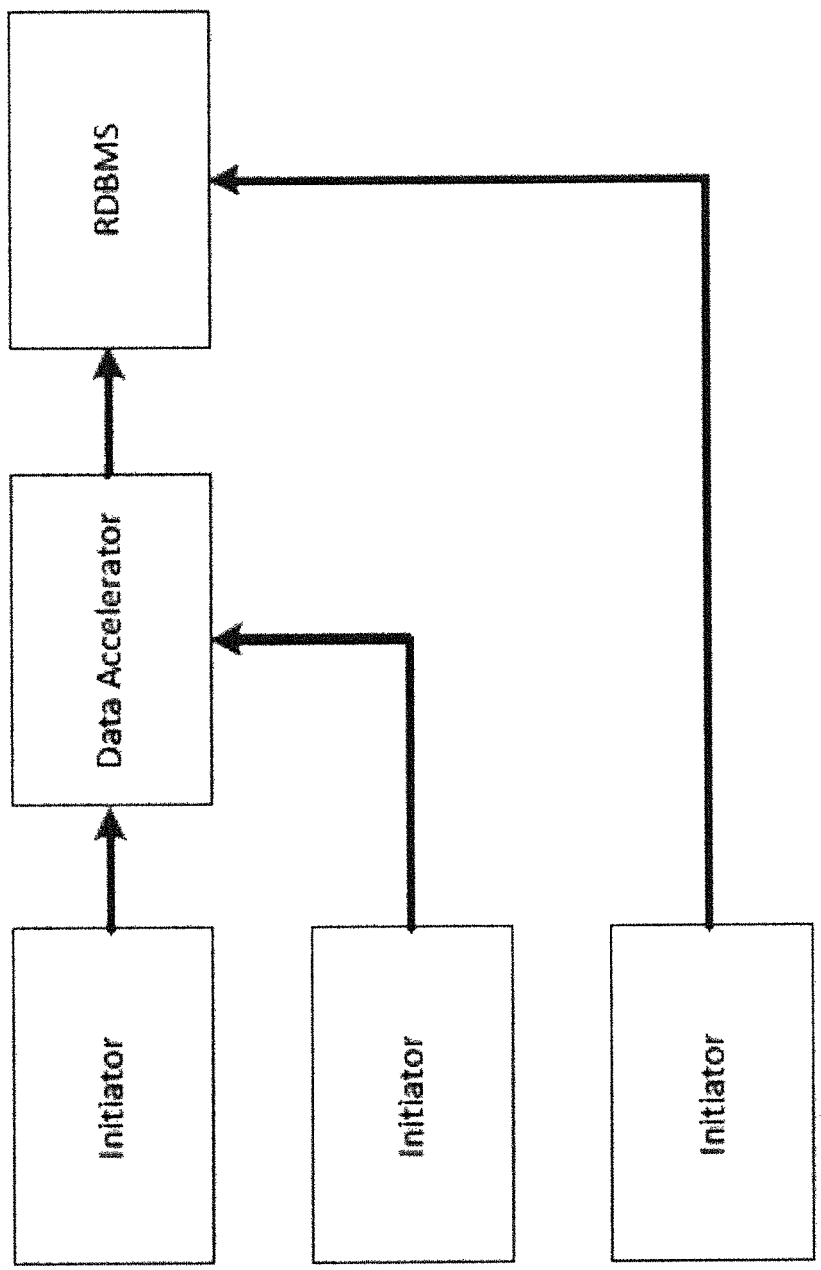
FIG. 15 shows that Different initiators at either the same or separate locations can go through any route of Data Accelerator instances.
Figure 16:
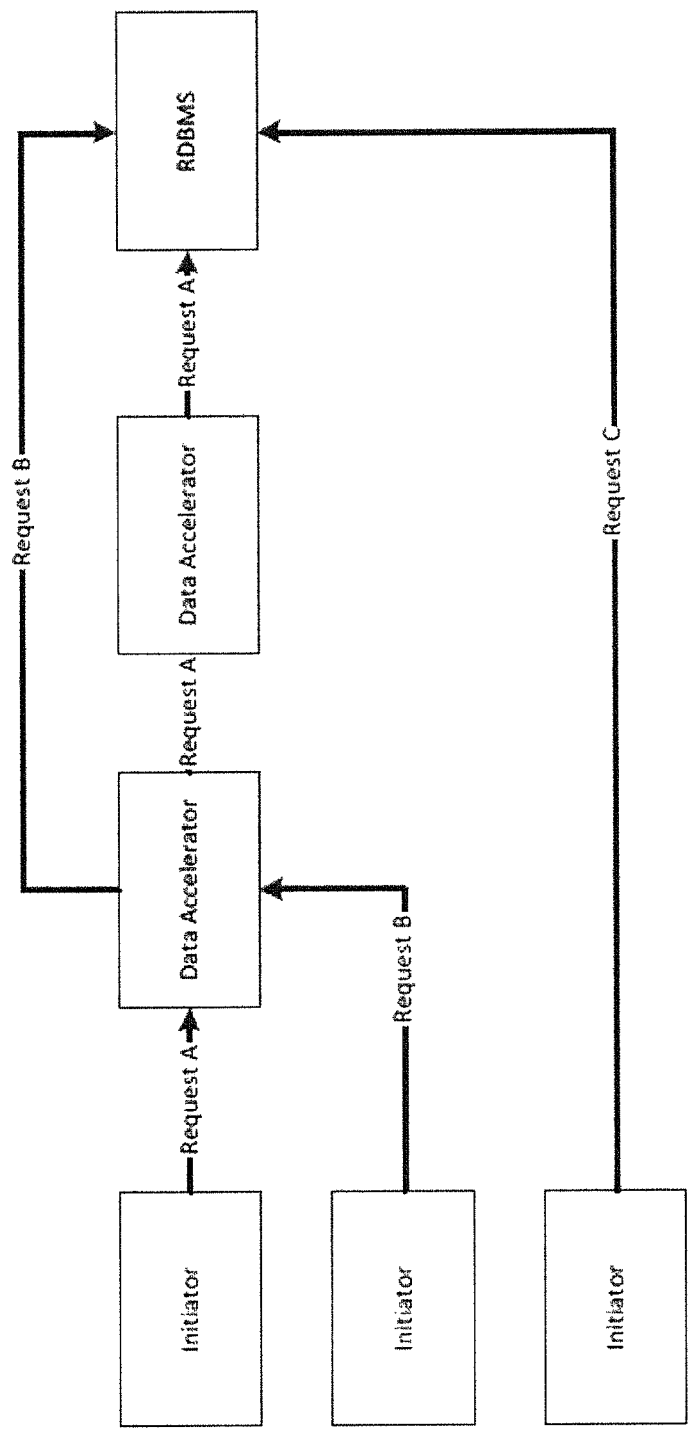
FIG. 16 shows how the Data Accelerator can change the route to the DBMS depending on where the request came from or a specific property of the request.

The path through a chain of Data Accelerator instances is not fixed but variable. Different initiators at either the same or separate locations can go through any route of Data Accelerator instances: see FIG. 15. FIG. 16 shows how the Data Accelerator can change the route to the DBMS depending on where the request came from or a specific property of the request. The Data Accelerators must be aware of other instances both up and down stream because some rules such as the compression rule will modify the request and it must be uncompressed before reaching the destination DBMS server otherwise the request would be invalid.

When the Data Accelerator sends a packet that has been modified, it wraps the contents of the packet in a specific message that the Data Accelerator will remove before forwarding to the DBMS or the initiator. In order that the Data Accelerator instances can know what rules they are allowed to apply to a packet, it uses a number of methods to understand where it is in the chain between the initiator and DBMS. One such method is for the first Data Accelerator instance in a chain to send a specially crafted DBMS request up the stream and to monitor for the response. Each instance has its own unique id. The first instance creates a request such as "SELECT uniqueID", the second adds its own id so it becomes "SELECT uniqueID, uniqueID" each instance in the chain adds its own id then when the response is received, the order of the instances unique id in the result set shows where it is in the stream.

Because Data Accelerator instances are aware of the chain and of other instances they are able to communicate between themselves within the network channel that has already been opened for the initiator. These messages allow the instances to share information about the requests and responses, such as how quickly they are being received at each point. With this information instances can dynamically determine how effective or detrimental a specific rule has been in a particular case so can choose to vary the applied rules (either not apply the rule or change the parameters to the rule or even test a different rule) to find the optimum performance enhancements. It is this dynamic learning that means Data Accelerator instances can consistently add benefit over time.

In order to analyse requests that are being sent to a DBMS, the Data Accelerator will extract the command that is being sent such as "SELECT A, B, C FROM XYZ" or the DBMS specific command in their own language such as Procedural Language/SQL (PL/SQL) for Oracle or Transact-SQL (T-SQL) for Microsoft SQL Server and use the command as the basis for applying the different rules that it has available.

Figure 17:
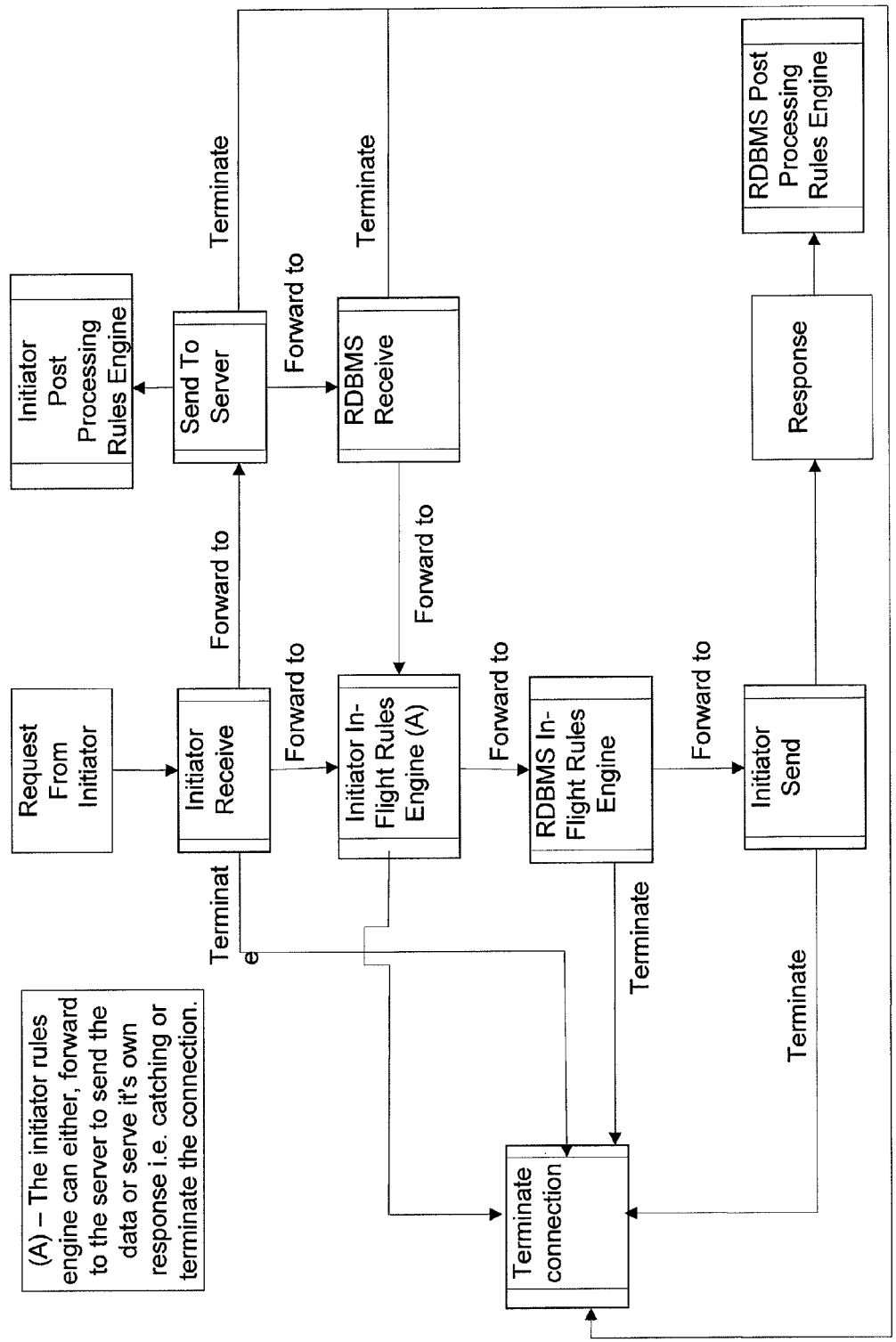
FIG. 17 shows the different points that the rules can be applied and the flow through the application. There are a number of different types of rules that can be applied at different points within the request/response stream.

There are a number of different types of rules that can be applied at different points within the request/response stream. Section E below expands on these rules. FIG. 17 shows the different points that the rules can be applied and the flow through the application. The rules are as follows:

Initiator In-Flight Rules
　The request is received and rules such as the caching rule can decide to allow the request or serve a response directly from cache Initiator Post-Send Rules
　The request has been sent so rules such as the pre-caching rule can send other requests which may well be needed DBMS In-Flight Rules
　The response is received from the DBMS; rules such as the compression rule can be applied before it is sent to a downstream Data Accelerator instance.

DBMS Post—Send Rules
　The response has been sent so the diagnostics rule can determine how good a job it did and how it could have been better.

We can follow a request with a specific example:

1. A request comes in and the protocol specific parser determines that the command is "SELECT a, b, c FROM xyz".

2. The initiator In-Flight rules are applied
　a. The caching rule determines that it is in cache but has expired so cannot serve it
　b. The compression rule determines that there is an upstream Data Accelerator instance and the network link is slow so the data is compressed and wrapped in a Data Accelerator packet.

3. The request is sent upstream.

4. The Initiator Post-Send rules are applied
　a. The pre-caching rule determines that normally when this is sent, there are an additional 5 commands which are always run so it schedules the next 5 requests, the 5 requests are sent through the normal set of rules so caching and compression etc. can still be applied.

5. While the Initiator Post-Send rules are in progress, the response is received from the upstream servers. It is then passed through the DBMS server in-flight rules.
　a. The compression rule determines that the data is compressed and there are no downstream Data Accelerator servers so the data is uncompressed.

6. The response is then sent back to the initiator

7. The DBMS Post-Send rule is then applied
　a. A diagnostics rule determines that the upstream link is a fast link and there is little or no latency so after running a test to compare how long it takes to compress data and how long to send over the network, the compression rule is turned off for upstream packets less than 1k in size.
　b. The pre-caching rule discovers that only 4 of the 5 commands it expected have been used and this has been the case for the last 5 times the specific request was sent so the caching rule has been modified to only request the 4 queries instead of the original 5.

The key is that the Data Accelerator provides the rules but also diagnostics and in-built learning to change the rules dynamically to react to events as they happen.

Section E: the Optimisation Rules

We now look at how each of the individual rules work to provide the benefits already mentioned.

Simple Caching Rule

If we start with the simple caching rule, there are three parts, the actual caching of data called the "cache data rule", the serving of cached data called the "cache serve rule" and the diagnostics component "cache diagnostics and management".

In order that the Data Accelerator can cache data, the cache data rule runs after the response has been sent back to the initiator because, at this point the Data Accelerator has seen the request that was sent and the response that was returned, it has everything it needs to cache the data. There are a number of different types of cache that can be used, these include an in-process and out-of-process or separate machine cache and on permanent storage such as a hard disk. The cache is effectively a hash table lookup with the key being either the SQL command from the request or a hash of that SQL command.

Depending on the type of cache, it will either store a pointer to the first response packet or it will store the actual packets as an array.

Before a response can be added to the cache, the rule must determine whether a request is actually cacheable. There are a number of factors which affect whether or not something is cacheable, there are certain types of SQL command which are inherently non-cacheable, for example an UPDATE or INSERT request, if this was cached and not forwarded onto the DBMS it could cause data corruption which is not acceptable. Other commands need to be looked at in the context that they are being used, for example an DBMS will have a command to retrieve the current date and time. If a request is sent to get all records in the future, depending on when the query was next run and if any records were added or deleted, it may or may not have a different set of results. If it is determined that the request can be cached, it is stored in the actual cache. If it cannot be cached, then we still store the request so further requests don't have to be verified.

Once a request/response are stored in a cache, the cache serve rule can be applied to requests as they arrive but before they are sent onto the DBMS, if the request is in the cache, it is verified to ensure that it is still valid, for example there have not been rows added to, deleted from or modified in the cached response. The users' permissions are then verified to ensure that they have the correct level of security to access the response and if they are allowed access then the response is returned.

The cache diagnostics and management rule's role is to verify how well the cache has worked for a specific request, to manage the cache size by expiring unused or not often used requests as well as expiring items which are no longer valid. To work out how effective a cached response was, it compares the total time it took the DBMS to return the response and compare it to how long it took to verify that it was still valid, check security and return the cached response—if the request is such that it is small and responds almost instantly then it may not be worth caching. If the diagnostics determine that caching the request is not adding a benefit, it will still monitor later requests to see if at any time it does become worth caching.

To see if a request is still valid the rule has a record of the items that the request used within the DBMS and monitors those for changes, if the changes affect the response then it can either decide to just evict the item from the cache or it can re-run the query so it has the latest response available in cache.

To manage the size of the cache, every time an item is served a counter is incremented and the time noted, if an item hasn't been used for a set amount of time or it is only rarely used then it can be evicted from the cache.

Intelligent Caching Rule

The next rule is the intelligent cache rule; this is similar to the simple cache rule in that it has three components and in fact can share a cache with the simple caching. In some situations the simple caching is not as effective as it could be. For example if the response to a request changes, the entire response is discarded. With the intelligent rule, it can assess how much of the response has changed and if it is under a certain percentage, which is determined by the diagnostics component, the cached response will be modified so that it is up to date. Where this is of most use is where a chain of Data Accelerator instances are being used perhaps, one close to the DBMS and others at remote offices, the intelligent caching rule can just request the portions of packets that have been changed from the upstream instance that is close to the DBMS so that the minimal amount of data is sent over the network to the local instance, which then merges the changes and then returns the cached response as required. The cache data rule works in exactly the same way as the basic caching rule, in that it determines the cacheability and stores it in a hash table.

The cache serve rule and the diagnostic rules however need a much more complex method to determine if the results can be merged or simply discarded. The rules will decide on whether to do a merge based on factors including the size of the response in that a small response may be quicker to get direct from the DBMS. It also takes into consideration how much of the data has changed. It does this by getting an upstream Data Accelerator instance to physically re-run the request. Once the upstream instance gets the response, it can analyse each packet in turn to see if it has changed at all and if it has what percentage of the packet is different. Once the rule knows how much of the data has changed, it can determine what to do and how complicated it is. Some changes are more complicated, for example, if the size of a packet has changed, either due to extra rows being returned, or a string changed then details like the packet size and protocol specific information need updating, but if something has changed but the length of the packet is the same i.e. swapping "Company A" for "Company B" then it is simply a matter of swapping the "A" for "B" which is an easier modification to make.

Compression Rule

If we now look at how the compression is implemented, compression relies on there being a chain of Data Accelerator instances between the initiator and DBMS, at the very least there needs to be two instances, one to compress and one to decompress the packets. Either the request or the response can be compressed but typically requests are small enough that compression is usually ignored. The compression piece is made up of three rules, the "compress rule", "decompress rule" and the "compression diagnostics".

The diagnostics component analyses network bandwidth within the chain of Data Accelerator instances to discover what speed each of the up and down stream networks are running so a score based on the performance can be used. Over time the performance will be verified to ensure if anything changes, or if there is a particularly busy period on a portion of the network, it is taken into consideration. The diagnostics component also checks to see how long it takes to compress/decompress packets and compares that to the time it takes to send over the network to find the best ratio of packet size/compression size over CPU cost to decide what to compress and what to ignore.

The compression rule will use both the network performance and the CPU compression cost ratios to determine whether a specific request or response should be compressed. If it is to be compressed it takes the packet(s), compresses and wraps the compressed data in a Data Accelerator compression envelope which can then be forwarded. The wrapper which contains the data is then sent either up or down stream depending on whether or not it was a request or response which was compressed.

The decompression rule examines each request and response to determine if they are compressed or not. If they are compressed, the rule will determine whether the link contains a Data Accelerator instance. If there is no instance that exists then the data is always uncompressed. If an instance does exist then the data is still uncompressed but only so that rules like the caching rule can be applied at each level; in this case the uncompressed data is not forwarded.

Pre-Caching Rule

The next rule is the pre-caching rule. This is made up of one component, which intercepts requests after they have been forwarded upstream or to the DBMS. The rule is based around a map of requests that have previously been run through the instance. Each request that has been run links to the next request that was sent, if that same series of links had been made before then the pre-caching rule can run the next set of queries.

Figure 18:
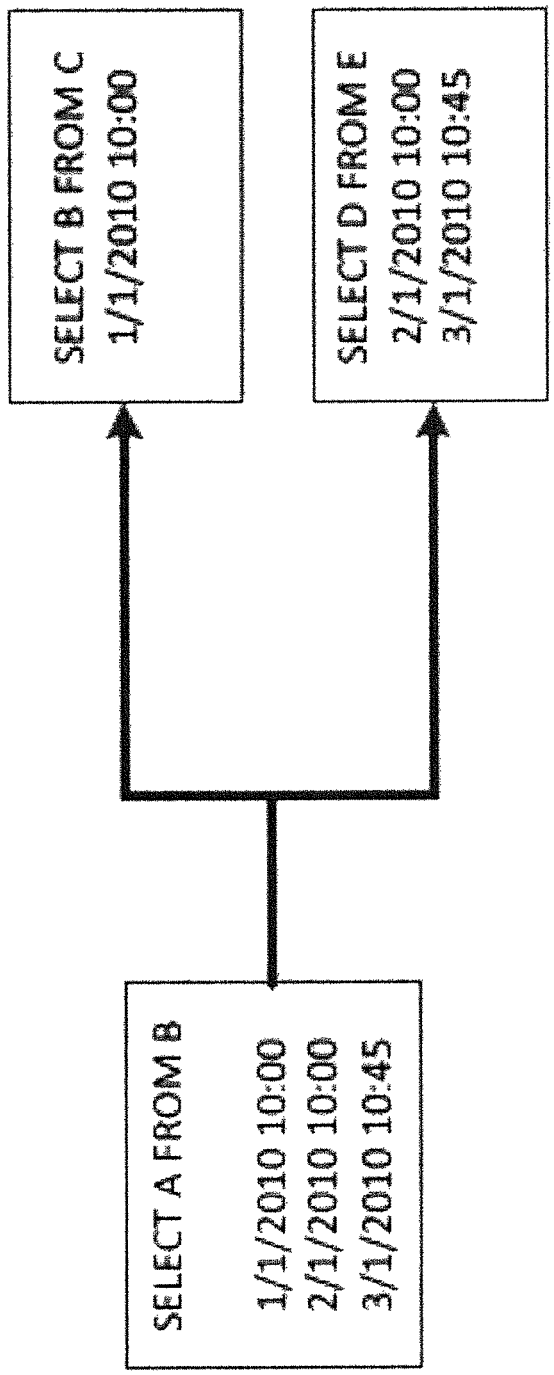
FIG. 18 shows that the first query was run three times, the first time it ran, the next request included the query "SELECT B FROM C", but all subsequent requests were for "SELECT D FROM E", so the pre-caching rule on the Feb. 1, 2010 (format: day/month/year) would have added a request for "SELECT B FROM C" which would not have been used, so this would then not be selected for pre-caching again but on the Mar. 1, 2010 the same query was run again so would have been selected for pre-caching and would have had the results ready when it was requested.

If you look at FIG. 18 we see that the first query was run three times. The first time it ran, the next request included the query "SELECT B FROM C", but all subsequent requests were for "SELECT D FROM E", so the pre-caching rule on the Feb. 1, 2010 (format: day/month/year) would have added a request for "SELECT B FROM C" which would not have been used, so this would then not be selected for pre-caching again but on the Mar. 1, 2010 the same query was run again so would have been selected for pre-caching and would have had the results ready when it was requested.

The criteria the pre-caching uses for selecting or removing requests from pre-caching is based on how many times a sequence of queries has been run as well as how expensive to run a request is. If a series of requests complete very quickly then it may well be worth pre-caching those even if they are not always used. Conversely if a request takes a long time to complete then it might not be worth running it just in case it is used.

Pre-Caching can also look for patterns in requests. For example if a request came in with the SQL command "SELECT*FROM Country WHERE CountryName='England'" and then the next request was for "SELECT*FROM Employees WHERE CountryID=1024" it is likely that the CountryID was returned from the first query. The pre-caching rule can then get a list of all CountryName and CountryID fields by querying the Country table directly, so when a request such as "SELECT*FROM Country WHERE CountryName='Wales'" the id could be inserted into the next query "SELECT*FROM Employees WHERE CountryID=??".

Query Batching

The next rule is the query batching rule which will stop duplicate queries running at the same time. This rule runs after the request has been received and before it has been sent to the upstream instance or DBMS. The rule has a list of currently executing requests and if the current request is already being run then it is held. The rule waits on the response from the request that is already executing and puts the new request on hold, adding it to a list of waiting requests. When the response returns, the rule copies the response to each waiting request.

The query batching rule needs to employ the same definition of cacheability that the caching rules use to decide whether or not something is cacheable because some things like INSERT or UPDATE queries need to be run on the server whether or not they are duplicates.

String Replacement Rule

The string replacement rule works by replacing common strings with specific id's which allows the rule to minimise the amount of data that is sent over the network. For example if a company name appears in a number of queries then depending on the length of the company name it can save quite a lot of network traffic by replacing "Company Name Corporation" with ":1:" or some similar identifier. This can work with either the request or the response and relies on there being more than one Data Accelerator instance in the chain: one to replace the strings and one to restore them.

If a packet contains string replacements then it is wrapped in a replacement envelope. When an instance receives a packet for forwarding, if there is an appropriate up or downstream Data Accelerator instance, it will replace the strings so it can apply any other rules on the instance but forward the original message. If however the upstream is the DBMS or the downstream is the initiator then the strings are put back into the message and forwarded on.

DBMS Load Balancing Re-Routing

Figure 19:
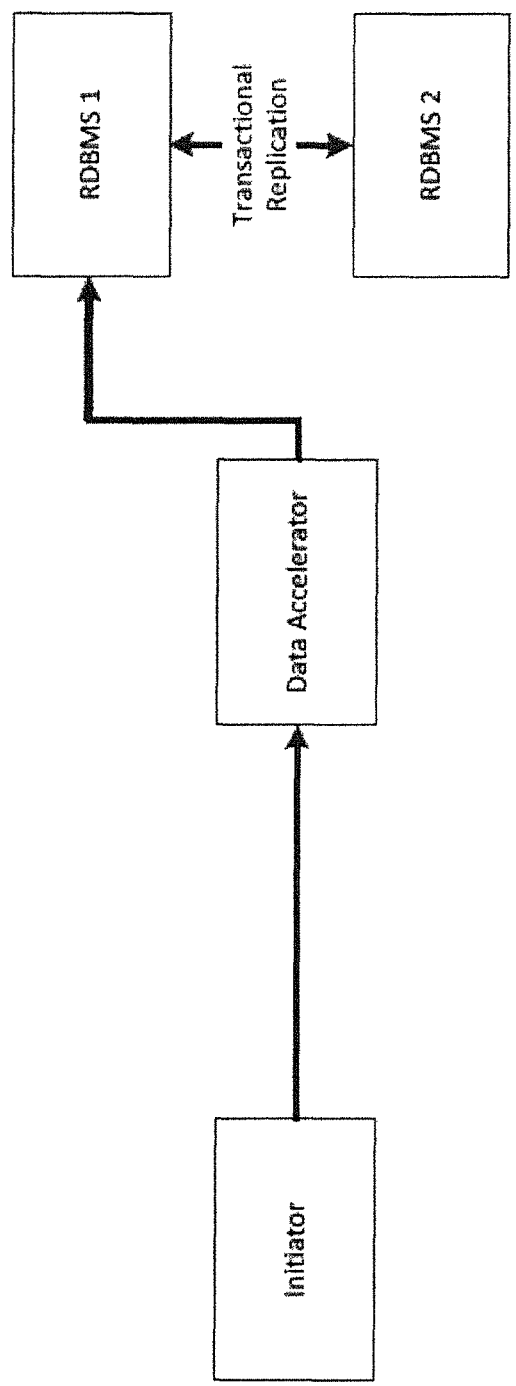
FIG. 19 shows two DBMS systems that replicate data between themselves and the Data Accelerator sending requests to the DBMS 1 system.
Figure 20:
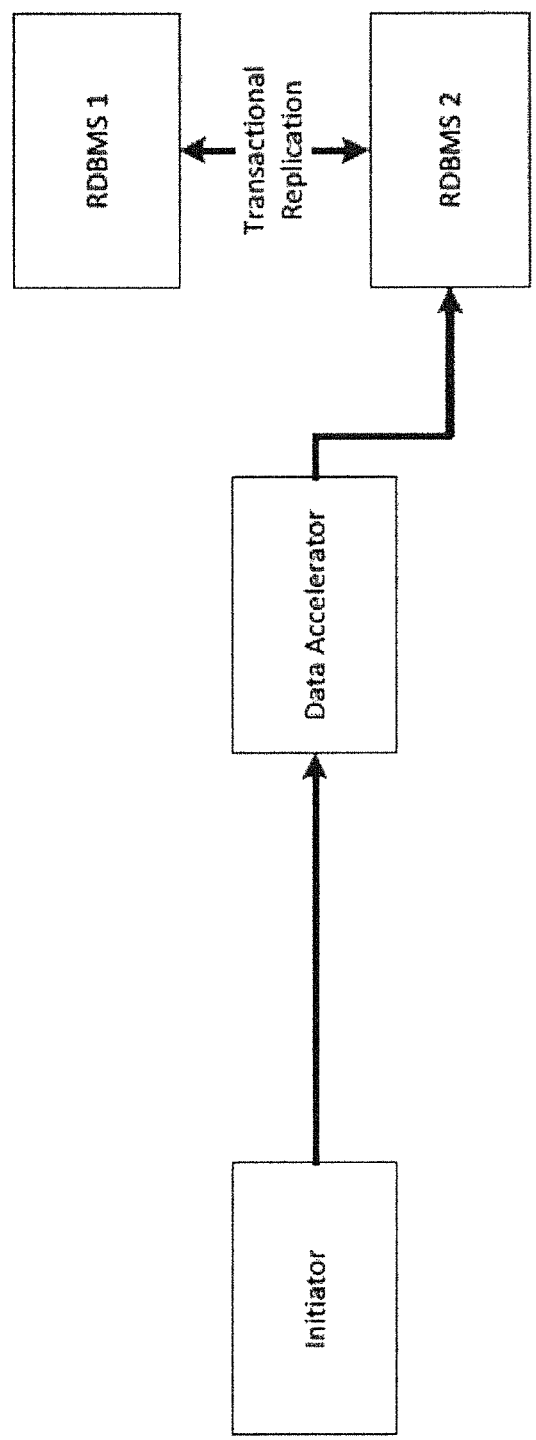
FIG. 20 shows that if the load balancing rule determines that system 1 is under too much load and it is affecting query performance, it can switch to send requests to DBMS 2.

The re-routing rule monitors the load of a DBMS and chooses to run the query on the least used DBMS system. The re-routing rule requires some configuration and some specific requirements of the DBMS. The rule must have the details of the DBMS systems that can handle specific requests and the databases themselves must be able to handle requests no matter where the request ends up. Examples of these are read only databases or where transactions are copied to each database. FIG. 19 shows two DBMS systems that replicate data between themselves and the Data Accelerator sending requests to the DBMS 1 system. If the load balancing rule determines that system 1 is under too much load and it is affecting query performance, it can switch to send requests to DBMS 2 as shown in FIG. 20.

Re-Routing of Requests Over Separate Network Paths

This rule needs to be configured with multiple upstream Data Accelerator instances which can be connected via separate network routes. It has two components, the diagnostics rule and the redirector rule. The diagnostics rule constantly checks the performance of both up and downstream routes to score each one based on performance. The redirector works by intercepting requests before they are sent upstream and sends them via the fastest route at that time. It works with responses by intercepting them before they are sent back downstream in the same way.

Request Modification

This rule works by taking the request that was sent and modifying it to send a request that only asks for the minimum amount of data that is actually required. This rule does require that it is configured with a list of SQL commands it can modify. When a request arrives, it is checked against a list of SQL commands which can be modified, if it can be changed it swaps the portion of the SQL command that can be changed with the replacement query and then the response is rebuilt and then forwarded on. This rule does not apply to responses.

An example of a query that can be modified is a search screen that only shows a small number of records at a particular time and for each page re-runs the query which selects all records in the system. The query "SELECT * FROM B" could be modified to "SELECT TOP 10*FROM B", the benefit of this rule depends on the actual queries and how the initiators are using the results.

Pre-Validation Rule

The pre-validation rule takes the request, retrieves the SQL command and runs it through a series of checks to ensure that the request can actually be completed. If it finds that it cannot be completed then it returns the DBMS specific error message/code. The rule runs after the request has been received and before it is forwarded onto the upstream DBMS.

The checks it can carry out include a syntax check on the command to validate that the DBMS will actually accept the request. It can check that the request includes an actual command and is not just a comment, i.e. in a typical DBMS system "/*SELECT*FROM A*/" will not return a result as the command is commented out. It can also verify that the user has the permissions to run the query which will always result in a failure. The main benefit of this rule is that commands which are not valid do not need to travel over the network or to the DBMS for it to fail it outright.

Encryption Rule

The encryption rule requires that there be at least two Data Accelerator instances in the chain and typically the rule encrypts the traffic, both the request and the response when sending the data over an unsecured network like the internet. There are two parts to the encryption, the encrypt rule and the decrypt rule. When the request is received but before it is sent upstream towards the DBMS, the last thing that happens is that the data is encrypted if the link requires it. The encrypted data is wrapped in an encryption envelope and as the encryption is the last rule to run, the data may or may not be compressed or otherwise changed by an earlier rule. As each instance receives the request, if it is encrypted it decrypts it so the other rules can be applied. When it forwards the message, depending on whether or not the link is secure it either re-encrypts and sends the encryption envelope or simply forwards the unencrypted data. The type and level of encryption that can be used on a link are configurable and can be different depending on which link is used, for example on one link the rule could use Secure Hash Algorithm SHA-2 over Transport Layer Security TLS 2.0 but on another link use MD-5 (Message-Digest algorithm 5) over Secure Sockets Layer SSL 1.

Custom Rules

To ensure that things like auditing or logging occur in a DBMS system a custom rule can be put in place to run a specific command on the system as events occur in the Data Accelerator. In a typical system, there would be some auditing when a user carried out a specific action, for example if someone retrieved all the annual wages of all employees, it would need to be audited but if the caching rule had been applied then the request would not have arrived at the DBMS to be logged. The custom rules item is configured with a list of queries or events such as DBMS load balancing or network path re-routing and then a list of actions such as writing to a log file or sending a separate request to the DBMS.

Peer to Peer

If we now take a look at how the Data Accelerator instances in a chain or on a network can help each other by sharing diagnostics information and data between themselves and how that then can increase their effectiveness.

For individual rules to be most effective they typically use a diagnostic component to find optimum method of working to get the fastest response for the initiator, often where one instance has calculated something it is useful to the other instances that are available. There are two methods for communicating between Data Accelerator instances, the first is when the instance is not sure if the upstream point is another instance or the actual DBMS and it sends an DBMS request with the information that the Data Accelerator needs but that will not actually do anything if it does reach the DBMS. We can demonstrate this when an instance wants to enumerate the chain of instances and find the speed of each network link, it can send a request such as: "SELECT '1 January 2010 09:43: 22.02' As DAInstance4AA5888240B4448e9E20-62A8F70CF595, current_date As ServerTime"

The DAInstance4AA5888240B4448e9E20-62A8F70CF595 is the unique id of the Data Accelerator Instance, when the response comes back, it will include the time the request was started and the time on the server, and this gives an indication of how long it took to get a response from the network. When there is a chain of Data Accelerator instances, each instance adds its own uniqueID and time so the request actually ends up as "SELECT '1 January 2010 09:43:22.02' As DAInstance4AA5888240B4448e9E20-62A8F70CF595, '1 January 2010 09:43:22.04' As DAInstance936C4368DE18405881707A22FDBCFE59, '1 January 2010 09:43:23.09' As DAInstance8F4AEA5AE4D544cd9B56DF16F7563913, current_date As ServerTime" The response from this will be a data set such as is shown in FIG. 6.

Each instance can then instantly see where it is in the chain and also that the speed of the link between the 2nd and 3rd instances is a slow link so they can make better decisions based on this knowledge.

Also if the first instance receives a request such as this, it then knows there is a downstream Data Accelerator instance and instead of re-running the query, after combining the request it received with the results it already has it can simply share the updated results with both the initiator and the upstream servers.

Figure 21:
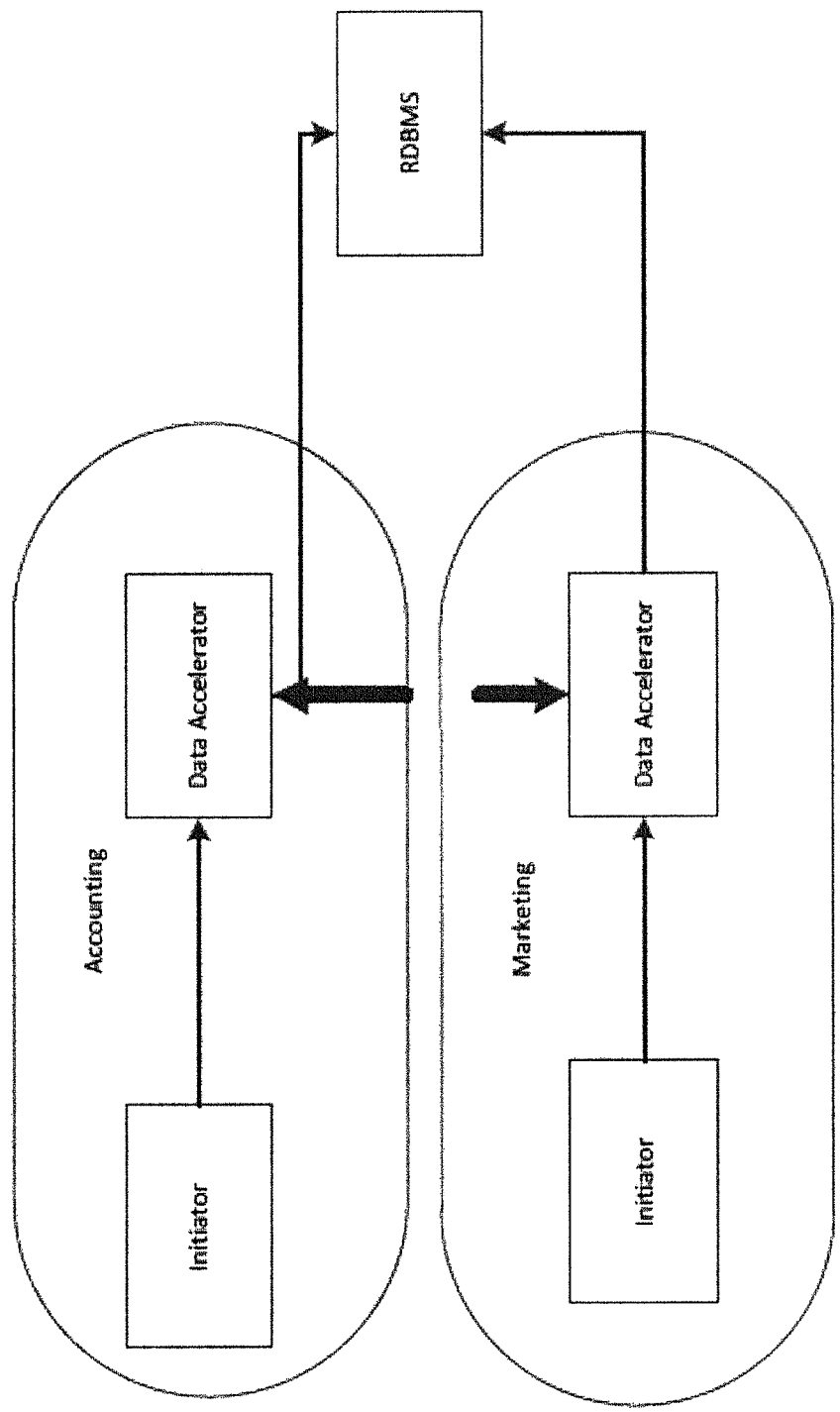
FIG. 21 shows how there are two separate workgroups, Accounting and Marketing; they both use the same DBMS but rarely run the same queries.

The second method of communication is where an instance knows that another instance exists and wants to either find out what it knows or wants to pass on some information, it creates a connection using the DBMS network method but instead of the network packet that the DBMS expects, it sends a Data Accelerator control packet. The control packet instructs the instance, not to forward packets up or down stream but to pass the packet onto the specified rule. The rules are given the information in the control packet and it acts on that as required. If we take a look at this in detail with an example of the caching rule, FIG. 21 shows how there are two separate workgroups, Accounting and Marketing, they both use the same DBMS but rarely run the same queries. Each department has their own Data Accelerator instance which connects directly to the DBMS. Because there is no chain the instances cannot communicate by sending requests up the chain. Instead they create a connection using the standard DBMS method and use this to send control packets. In the case of caching, where a request comes in from the Marketing which has already been served to Accounting, the caching rule, as well as checking its own cache can ask the Accounting instance if it has the query cached, if it does it can serve it without having to send the request to the DBMS.

Figure 22:
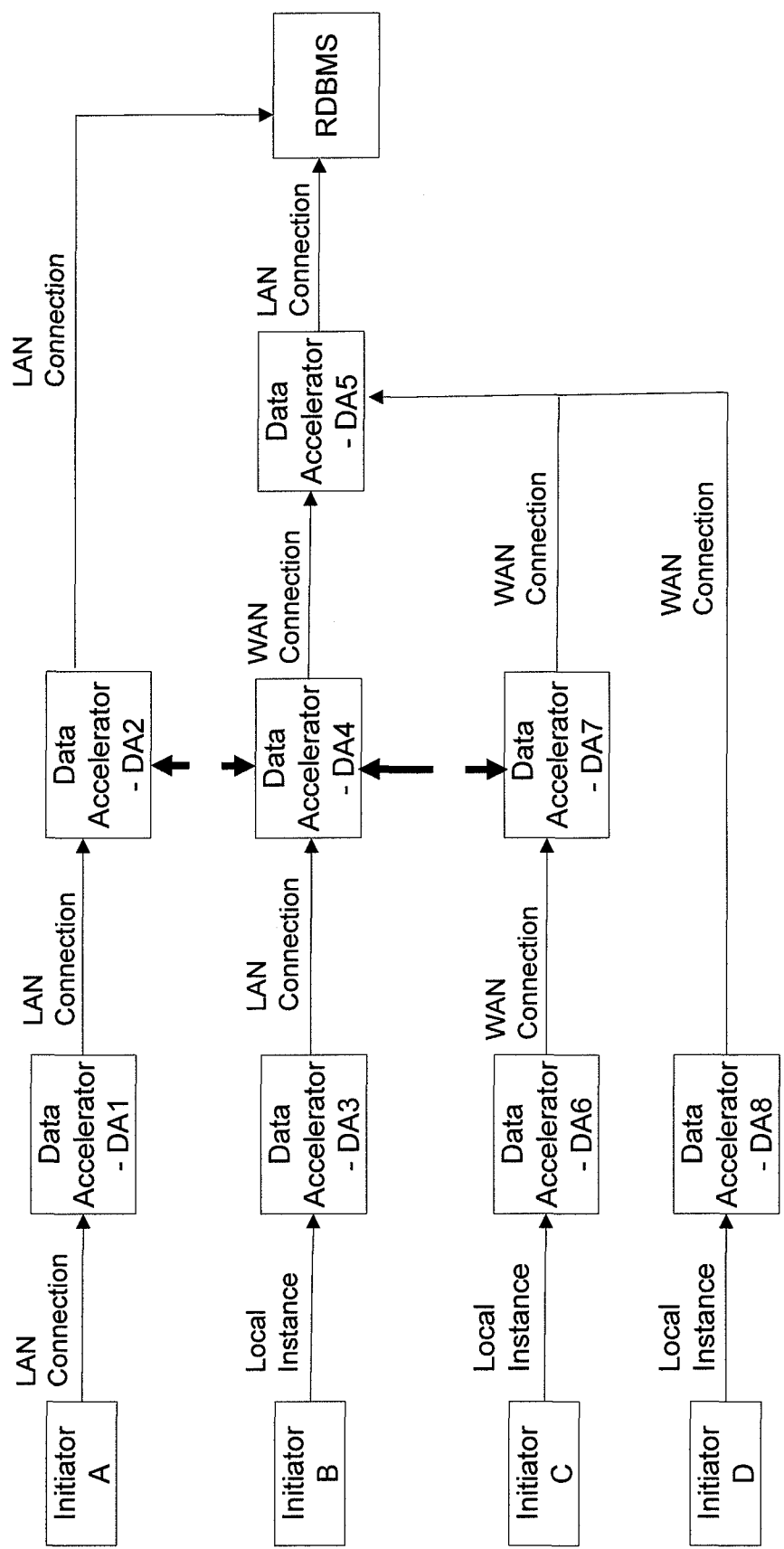
FIG. 22 shows a number of different configurations that instances can have to connect to a DBMS.

Because the Data Accelerator can work and share information in this peer-to-peer way or via the instance chain, it can build a powerful network of shared data and knowledge. FIG. 22 shows a number of different configurations that instances can have to connect to a DBMS. If each of the initiators runs the same query, initiator A runs it for the first time so DA1 and DA2 both store it in their caches. Then initiator B sends the request. It has a local instance of Data Accelerator and that doesn't contain the response in cache and because of the network configuration it cannot talk to DA1. The request is forwarded to DA4. DA4 has a network link to DA2 and DA7 so it sends a control packet to both instances to see if they have the request. DA1 returns the response and DA4 then carries out the standard checks (is it allowed and has it expired). If the response is acceptable then it is returned to DA3 which sends it back to the initiator after caching the request itself. The initiator C then sends the request. Again DA6 does not have a copy so it forwards it to DA7, and DA7 does not have a copy but does have a link to DA4 which it knows has previously requested the query so it asks DA4 for the response. DA4 returns the response from its own cache. DA7 verifies and sends back to DA6 which caches the result and returns it to the initiator. At this point if initiator C resends the request it is served immediately from DA6. The initiator D then sends the request. DA8 does not have it in cache and has no peers it can connect to so forwards it on to DA5. This instance also does not have it in cache, but it does have a downstream instance that has the response but the link downstream is a slow WAN link so it needs to make a decision as to whether to send the request back down the link to DA4 or to send it to the DBMS. This decision is based on how long the query took to run on the server, how much data is in the response and how slow the WAN link is between DA4 and DA5.

Figure 23:
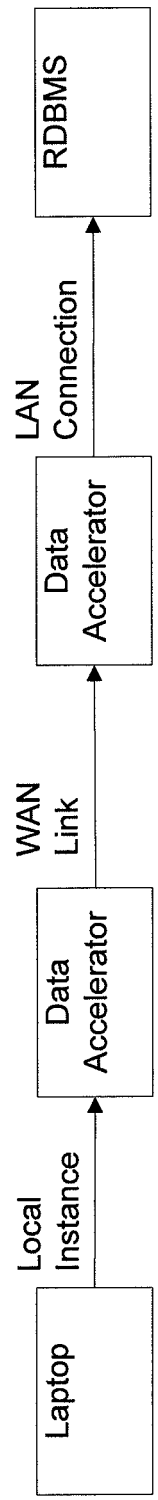
FIG. 23 shows the Data Accelerator instance chain when the laptop is out of the office.
Figure 24:
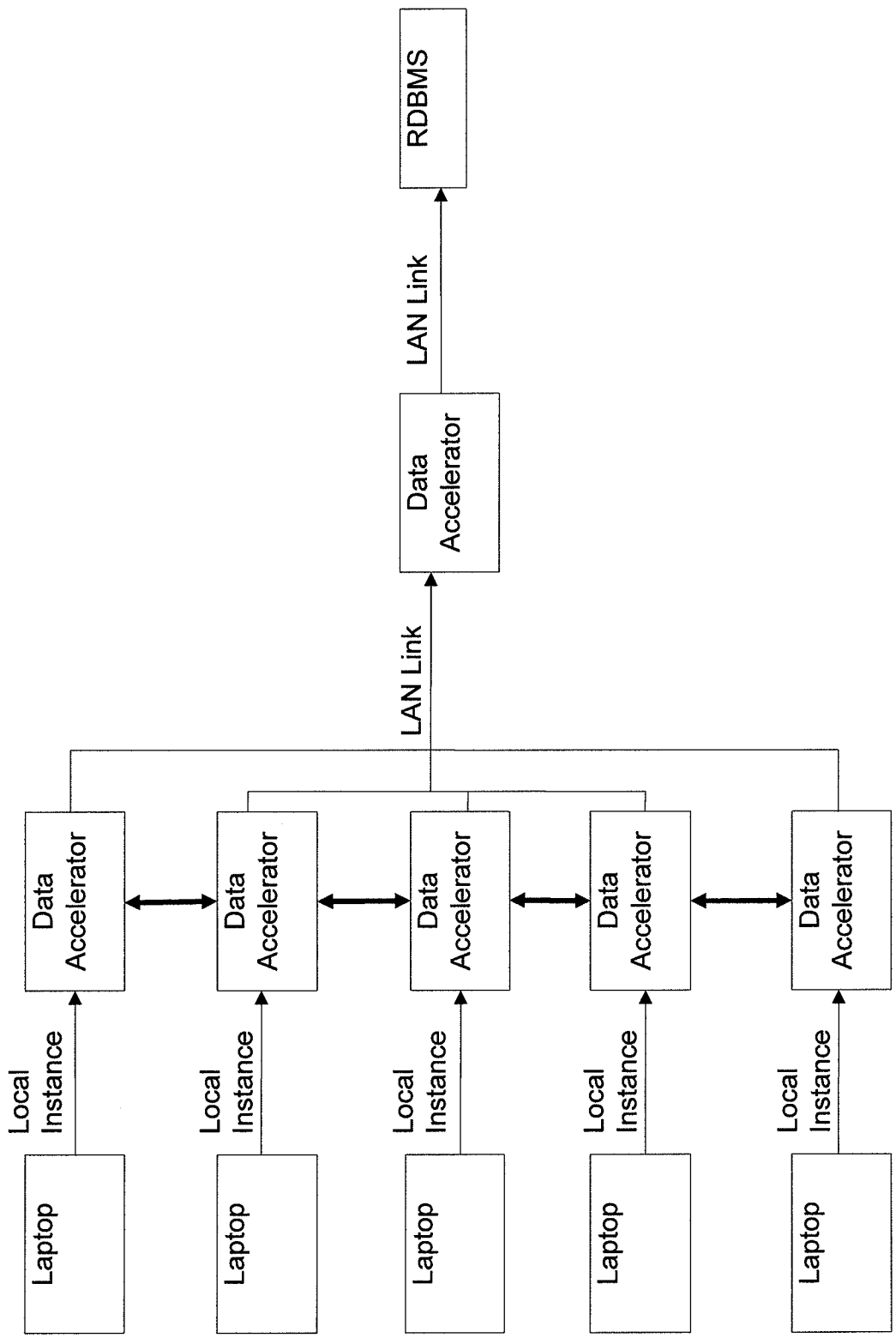
FIG. 24 shows how the instance, when in the office shares information and data with its peers.

Another scenario for the Data Accelerator is in a sales office where the salesmen have laptops. Each laptop has a local instance and when they are on the road this is mainly used for compressing the data. When the laptops are in the office, they can share their caches with the other laptops in the office. FIG. 23 shows the Data Accelerator instance chain when the laptop is out of the office and FIG. 24 shows how the instance, when in the office shares information and data with its peers.

Figure 25:
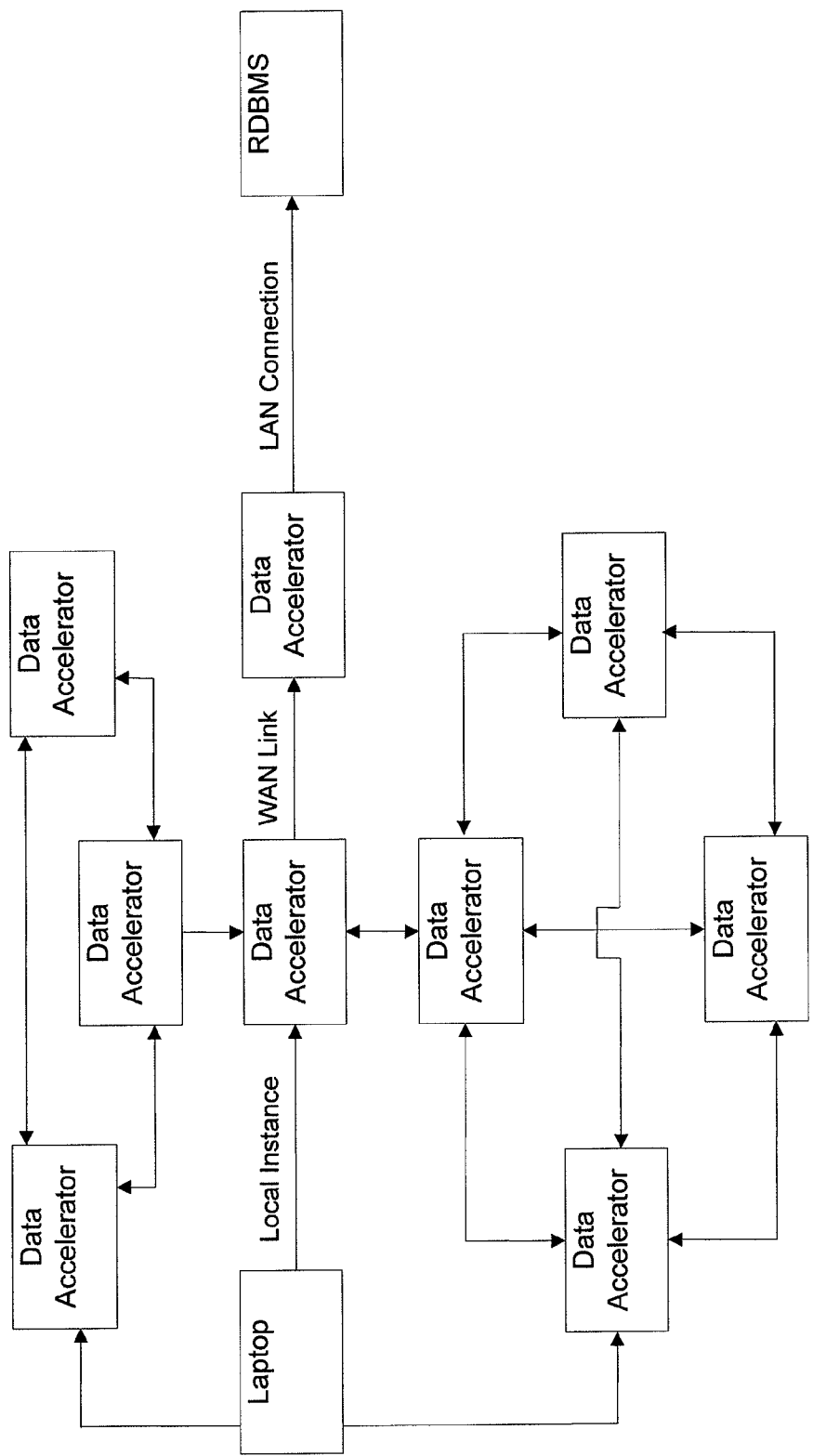
FIG. 25 shows a Data Accelerator instance which includes a WAN link.
Figure 26:
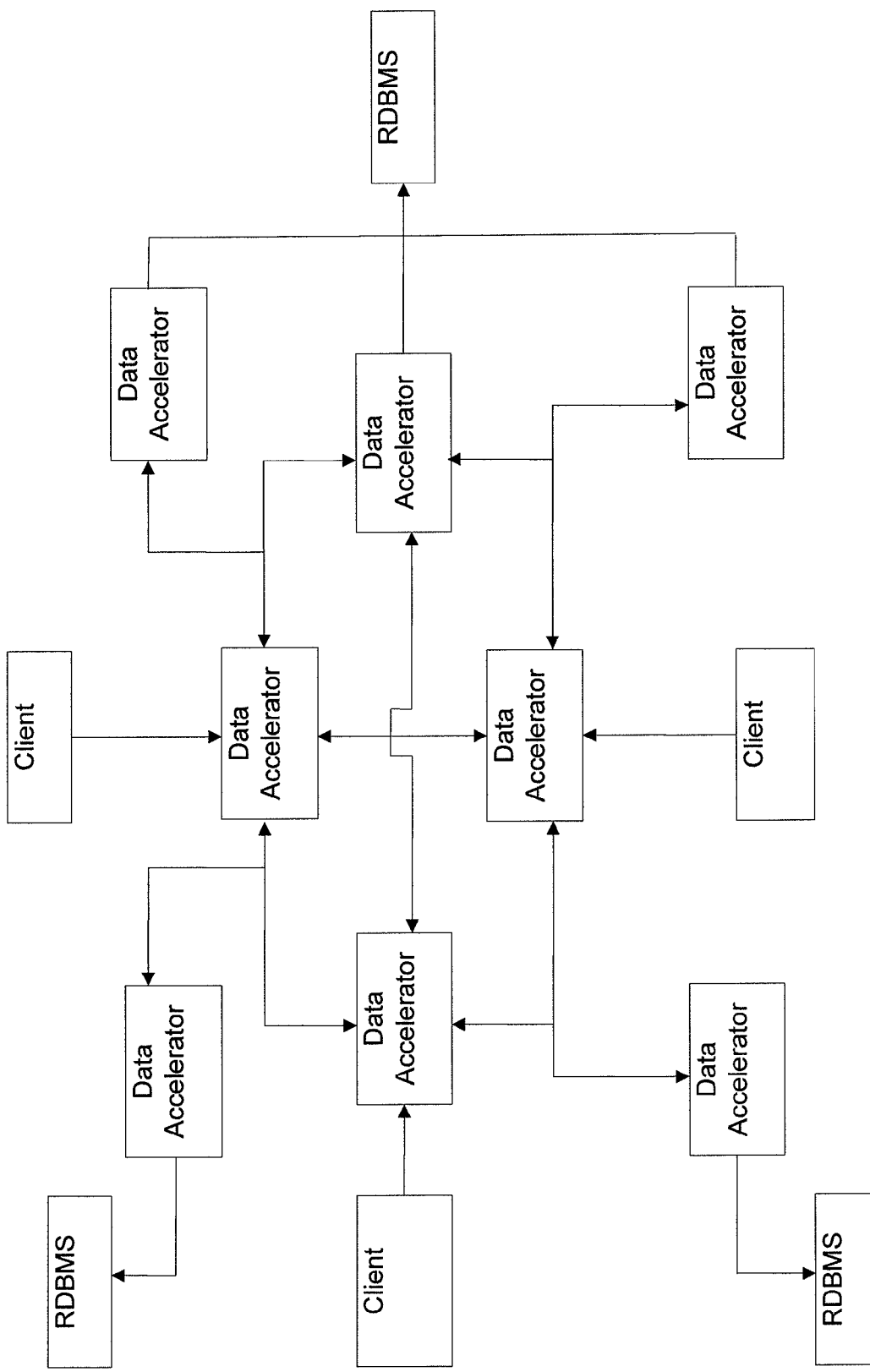
FIG. 26 shows an example of a configuration.
Figure 27:
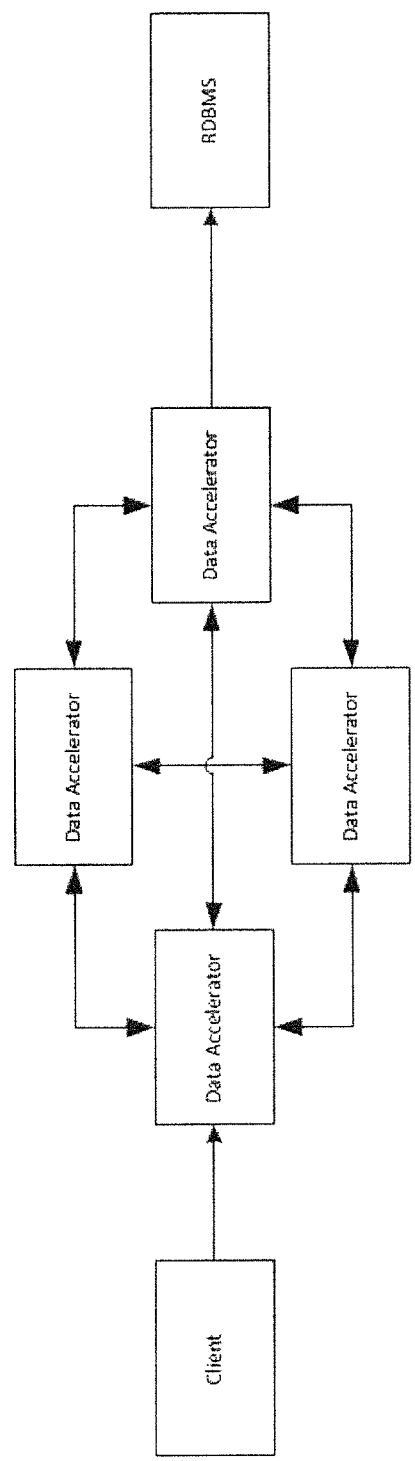
FIG. 27 shows an example of a configuration.

The links that the Data Accelerator can work over can be local connections so the instance runs on the initiators computer as a windows service, a UNIX daemon or whatever type of process is best for the underlying operating system. It can run over LAN links which are typically fast or it can run over slower WAN links (eg. in FIG. 25) or links over public networks in cloud based systems. When running over unsecure networks the Data Accelerator can use encryption to secure both the requests and response data.

Section F: Use Cases

Finally if we take a look at the different applications for the Data Accelerator we can see who may use it and in what situations.

Examples for use cases for Data Accelerator:

Data Accelerator can use the techniques described to help reduce the amount of queries that a database server has to make in order to produce the required results. This could be by serving the entire request from Cache or by requesting only portions of the information that has changed. Also clients can get the cached results from other clients using peer to peer.

An example of this may be a huge multi-terabyte database containing information from a supermarket's store card usage. When a team or internal staff are mining data from the database in order to track trends of customers or products, they may need to repeat many of the same queries but each time with some additional or different information required. By caching the results of the requests each time a team member runs a query they only need the database server to return any new results that no one else has already requested. With such a large database there is a significant amount of time required for each query and these apply significant load to the database server. This could mean that if a report is made up of 100 queries that each take around 30 seconds to complete, without Data Accelerator the time to run a report or mine the required data is 50 minutes. But if the first 80 queries are cacheable and take sub-second to respond through data accelerator, the queries complete in 11 minutes and 20 seconds.

Another example of how Data Accelerator can reduce the load on a database server is for a reporting application. An organisation has a large database with a record of new and historical customer purchases. Each week the managers within the organisation run a report of the purchases made and compare that to historical data. Normally the database server would have to return all of the data required for the reports. Using Data Accelerator when a user runs the report they can access all the historical data from cached queries that have been run before, and the database server is only accessed to run a small query for the current week's data.

When a database server is replicating to other database servers or if it is running a backup Data Accelerator can be used to reduce the need for existing data or portions of data to be requested from the database server. This can result in a significant reduction in the load on a database server as the only queries that are run on the database are for data that has been added or changed since the last replication or backup.

Figure 28:
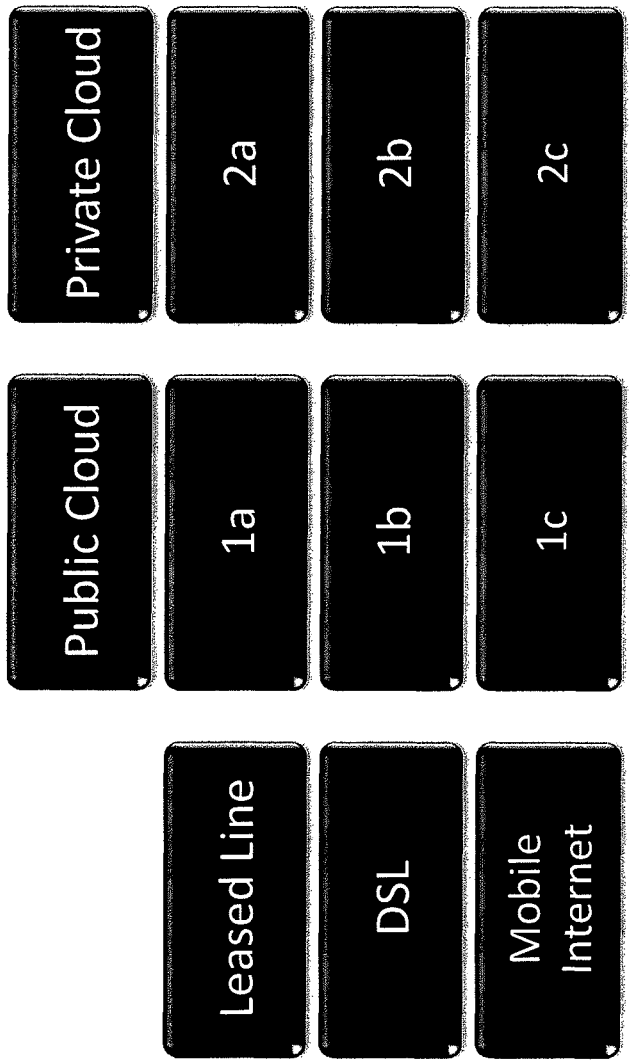
FIG. 28 shows a table of examples for use cases for Data Accelerator.

The second main use for Data Accelerator is to help reduce the load on the connection from the client application to the database servers. This is achieved by using the various techniques described for each connection that the client makes to the database server, and eliminating the need for the connection where possible. By being able to improve the performance of the connection between the client and the database server it is possible to move the database server from a local network connection onto a slower WAN connection. This could mean that the database server is moved into a public datacentre or public cloud environment or for an enterprise it may mean that the database server is able to be centralised into a private datacentre or private cloud environment. For either a public or private datacentre or cloud Data Accelerator will deliver improved performance and lower costs for all types of connection speeds. FIG. 28 shows a matrix of various scenarios; an example for each scenario is given below.

Example 1a (see FIG. 28): A university may have its application that tracks students' submissions of work and results currently running with a database server on each campus and the use of a Remote Desktop connection for students to log in from remote locations. The application without Data Accelerator is too slow to work without a high speed local network connection between the client application and the database server. The current infrastructure is very expensive to run and the experience for end users who connect remotely is very poor. By using Data Accelerator the database can be moved into a public cloud that provides low cost infrastructure and the campus locations and remote users or students can access the data using the client application on their local machine. To simplify the deployment of the client software application streaming can be used from a web page deployment. A typical use is for a tutor to download a students essay, which is stored in a binary format inside the database, so it can be marked. When the tutor is at home and using a dsl connection, it can take the tutor up to 5 minutes per essay but with the data accelerator using the rules to optimize the traffic, the same request can take as little as 25 seconds.

Example 1b (see FIG. 28): Car repair garages require software to accurately estimate the cost of repairing damage to a vehicle and this price must be in correlation with amount the insurance companies are prepared to pay for such a repair. In order to cost a job there is an industry database with all part costs and labour estimates. Currently each car repair workshop has to install a database server as the application is too slow when running over a WAN connection. For example to open a contact and an estimate takes 44 seconds on a local network and 1 minute 53 seconds on a WAN connection. The problem with having a database server in each car repair workshop is that it is costly to install and maintain and also it is complex to update the database each month with the latest database. By using Data Accelerator the database can be moved into a public cloud environment but the performance of the application can be nearly the same as with a local server. The example above would only take 49 seconds over a standard ADSL connection with Data Accelerator.

Example 1c (see FIG. 28): If a user is accessing an application over a mobile broadband, 3G or GPRS connection the problems caused by slow WAN performance are increased significantly. So if a user wanted to access the database server over a mobile broadband connection with the example above it would take several minutes on without Data Accelerator. With Data Accelerator it is possible to deliver near local network performance even over a very slow GPRS connection. This would apply to many types of applications that are used by mobile users, for example sales quotation applications.

Private Cloud

Enterprise organisations are more likely to want to centralise database servers into an internal private datacentre or private cloud.

Example 2a (see FIG. 28): An example of this would be a healthcare application for recording doctors practise records about patient visits, appointments and bills. This application would currently require a server to be installed in each physical location. For a large hospital group this could mean a large number of servers on large hospital sites, servers in each practise which may include some rural locations, and many other ancillary buildings. The cost of deploying and managing this large number of database servers would be very significant. Even if each building were connected using a high speed leased line, the problems caused by latency and general lack of bandwidth are enough to make the application unusable without a local database server. With Data Accelerator it is possible to remove all database servers and to maybe even downgrade some connections, then having a single database server or a server farm located in a private cloud environment. This would result is a significant reduction in costs.

Example 2b (see FIG. 28): An example of an application with a connection using a standard DSL line to a private cloud would be a Vetinary Clinic that has multiple branches with the animal database located at the head office. The Clinic is connected to head office over an ADSL line that has a maximum speed of 2.9 Mega Bits per second. The request to get animal history screen consists or 4 requests, 3 cacheable, 1 not. Without compression and caching it takes 2 minutes to open the history screen. With caching and compressions, after the details have been loaded once it only takes 5 seconds; the first time without caching but with compression takes 1 minute.

Example 2c (see FIG. 28): As mentioned above any of these examples would be even more affected by the connection performance when used on a mobile internet connection (3G, GPRS etc.) Using Data Accelerator would also mean the mobile users would be able to access the application. This could be on either a laptop with a data card or even on a version of the application that runs on a smart phone or mobile phone device.

An additional benefit of Data Accelerator is that for connections that have any kind or packet loss or unreliability, especially mobile internet connections that are affected by network coverage, the connection is automatically re-established and the application can carry on working once the connection is working again. Normally many applications will crash or end if the connection is dropped even for a short time. By having Data Accelerator intercepting the connection it can prevent the application from being aware of the connection problem.

Section G: Additional Uses

The process of intercepting DBMS requests, decomposing the request and applying a set of rules to improve the performance can also be applied to other systems outside of DBMS specific requests. Two other types of system include opening files over a network and web or HTTP requests.

The performance of opening files stored on a remote file server (which is anything that can store files) across a slow network is often poor and the difference between that and of opening files when they are local to the requestor is very noticeable. The data accelerator can decompose the requests for files from a file requestor (anything that can request a file—and hence includes end-users, applications, databases etc.) and pass the request to the rules engine which can apply any rules that are appropriate to improve the responsiveness of the client application. For example when a client requests a list of all the files in a directory on a remote share that is located over a slow or unsecure link the Data Accelerator can apply the following rules:

The cache serve rule to see if it already has a list which it can immediately return The cache serve rule can also see if a file was in cache but has changed and request the portions of the file which have changed to minimise the cost of re-caching the data The cache date rule to cache the response so it is available for future requests The pre cache rule can request all the files in the directory so they are immediately available when a future request is made The compression rule can apply compression to the file so that the data that is needed can be requested as quick as possible The encryption rule can be applied so documents and files can be carried securely over a public network.

A real world example of this would be a human resources (hr) department in a global blue chip company: the hr officers will store both general forms and also documents that relate to specific employees which vary in size and are confidential such as appraisal documents and details of behavioural and misconduct cases against employees. The hr officers will be based in remote offices and often travel to other offices and require fast access to the documents. Using the Data Accelerator means that the documents can be stored in one secure location and the users can access documents quickly and securely over remote links.

Web requests (from, generically, a 'web data requestor') can also apply the same set of rules that file requests can use because many webs requests contain static data which do not change such as images, documents and code files like html or css files. Traditional web caching services work by determining whether or not a resource has changed since it was last requested by using the If-Modified-Since HTTP header, whereas the Data Accelerator can be more forceful in applying more complex rules for example with a standard HTTP Get request that returns a html page, some images and some links:

The pre-cache rule can determine which images are required for the page and request them before the client does The pre-cache rule can follow the links on the page and request those pages so that they are already in cache if the requestor follows a link.

The cache serve rule can determine whether to serve something from cache based on actual content rather than the web servers last modified time.

The cache serve rule can also request portions of files which have changed as opposed to the complete file We can also apply the standard rules to:

The compression rule can compress in situations where the web server is not configured to compress data and smarter compression algorithms can compress data further than HTTP compression that typically uses gzip, reducing the time it takes to send it over the network.

The encryption rule can provide secure communication over the public internet without the need to use HTTPS/SSL on the client or web server, easing the management on the server and the security on the client.

An example of where a company that might employ the data accelerator to optimize web requests could be a publisher who keeps an electronic copy of their books in html format. Users who are remote can read the books but without the Data Accelerator there is often a delay for the next page and for images in the book. The Data Accelerator can use the pre-caching rule to automatically start downloading the next page or chapter so that it is immediately available as well as downloading the images required. The full suite of rules can also be applied so the request and response is compressed and encrypted so it can be carried over public networks.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

Concepts

Key concept A—Covers the Core Data Optimisation Concept

Method of optimizing the interaction between an application or database and a database server, comprising the steps of:

(a) routing data between the application or database and the database server through an optimisation system;

(b) the optimisation system analysing the data and applying rules to the data to speed up the interaction between the application or database and the database server.

Concepts re the Key Functional Advantages:
  Optimisation system enables the interaction between the application/database and the database server to be sufficiently optimised to enable a practical connection to be made over a slow or high latency link such as the Internet.
  Optimisation system reduces the amount of processing or operations to be performed by the server
  Optimisation system reduces the amount of data needed to pass between the client application and the database server.
  Interaction is the flow of data; the cessation of the flow of data; obviating the need for data to flow; managing the flow of data.

Concepts re the Key Applications:
  Database server is cloud-based, or on a local network, or on a WAN or if the DB server is local to the application.
  application or database is deployed, managed or updated to end-users using application virtualisation software.
  Method allows the number of database servers, or the load on the or each database server required, to be reduced.
  Method allows the load on the or each database server to be balanced or redirected in cases of fail-over.

Concepts that Differentiate Over Bespoke DB Coding:
  Optimisation system is added to an existing database client application or database server, and the structure of the tables and/or files of the database running on the database server, are each substantially unchanged by the optimisation system.
  Optimisation system is not an integral part of the client application or the database server or bespoke coding to the client application or the database server.
  Optimisation system changes either the application/database or the database server, but not both.

Concepts re the Optimisation System Structure:
  Optimisation system is implemented in software and includes a client application or a server application.
  Optimisation system is implemented in software and includes a client application and a server application.
  Optimisation system is implemented in hardware.
  Optimisation system is located between the application/database and the database server.
  Optimisation system is located on the application/database and/or the database server.
  Optimisation system includes multiple instances of individual optimisation systems that each provide optimisation services.
  The multiple instances include a chain or mesh of peers.
  Path through the multiple instances of individual optimisation systems is variable.
  Multiple instances of individual optimisation systems are able to communicate amongst themselves.
  Multiple instances of individual optimisation systems share diagnostics and performance information.
  Optimisation system can dynamically determine how effective or detrimental a specific rule is and can choose to vary the applied rules to find the optimum performance enhancement.
  Multiple instances of individual optimisation systems each understand where they are in the chain or mesh of peers between initiator and the server.
  Server is a SQL server.
  Data includes DBMS requests and responses.
  Optimisation system reduces the number of DBMS requests and/or responses.

Concepts re the Rules:
  Rule accessed through a rules engine.
  Rules engine decides when and how to apply rules.
  Rules define caching of queries.
  Rules define how to obtain diagnostic, performance, cached data, cachability information.
  Rules define how to configure other rules.
  Rules define peer to peer caching of queries.
  Rules define compression.
  Rules define encryption.
  Rules define predictive pre-fetching.
  Rules define string replacement.
  Rules define query batching.
  Rules define re-routing to specific database servers for load balancing or fail-over.
  Rules define re-routing to specific network paths for speed.
  Rules define request modification.
  Rules pre-validate requests.
  Rules define auditing and logging.
  Rules automatically tune, adapt or improve.
  Rules can be selectively enabled or disabled based on factors such as initiator and server addresses or locations, time of day, configuration, server load.
  Rules are applied at different points in the request/response stream.
  Rules are custom rules.

Key Concept B—Covers the App Store

Method of distributing software applications, comprising the steps of:

(a) providing multiple software applications accessible in an application store;

(b) routing data between one or more of the software applications and a database server, via a WAN such as the Internet, and through a data optimisation system that applies rules to speed up the interaction between the or each software application and the database server.

Additional Concepts:
  Software applications includes database client applications.
  Applications are distributed to end users' PCs.
  Applications are distributed to system integrators.
  Database server is cloud-based.
  Applications are deployed, managed or updated to end-users using application virtualisation software.

Key Concept C—Similar in Scope to Key Concept A, but to a System and not the Method Performed by the System
  A computer system including:
  (a) a remotely accessible database server
  (b) an application or database connected over a network to the database server, and
  (c) an optimisation system
  in which the optimisation system analyses data requests from the application or database and applies rules to the data to speed up the interaction between the application or database and the database server.

Key Concept D—Similar in Scope to Key Concept A, but to the Software Media Storing the Data Accelerator Type Code
  Computer readable media storing software defining an optimisation system to optimize the flow of data between an application or database and a database server, the optimisation system being operable to analyse the data and apply rules to the data to speed up the interaction between the application or database and the database server. In some embodiments, the computer readable media may comprise transitory computer readable media. In various embodiments, the computer readable media may comprise non-transitory computer readable media.

Key Concept E—Optimizing the Interaction Between a File Requestor and a File Server
  Method of optimizing the interaction between an application or database and a file server, comprising the steps of:
  (a) routing data between the file requestor and the file server through an optimisation system;
  (b) the optimisation system analysing the data and applying rules to the data to speed up the interaction between the file requestor and the file server.

Key Concept F—Optimizing the Interaction Between a Web Data Requestor and a Web Server
  Method of optimizing the interaction between an application or database and a web server, comprising the steps of:
  (a) routing data between the web data requestor and the web server through an optimisation system;
  (b) the optimisation system analysing the data and applying rules to the data to speed up the interaction between the web data requestor and the web server.

The invention claimed is:

1. A method, comprising:
   routing data between an application or database and a database server through an optimisation system;
   the optimisation system analysing the data and applying rules to the data to:
     predict portions of the data the database server is likely to provide to application or database, the predicted portions based on a particular request by the application or database to the database server;
     send the predicted portions of the data to the application or database in advance of the particular request for the predicted portions of the data;
     satisfy the particular request with the predicted portions of the data, the satisfying occurring remote to the database server, thereby speeding up interaction between the application or database and the database server.

2. The method of claim 1, wherein the optimisation system enables the interaction between the application/database and the database server to be sufficiently optimised to enable a practical connection to be made over a slow or high latency link such as the Internet.

3. The method of claim 1, wherein the optimisation system reduces the amount of processing or operations to be performed by the server.

4. The method of claim 1, wherein the optimisation system reduces the amount of data needed to pass between the client application and the database server.

5. The method of claim 1, wherein the interaction is the flow of data, the cessation of the flow of data, obviating the need for data to flow, or managing the flow of data.

6. The method of claim 1, wherein the database server is cloud-based, or on a local network, or on a WAN or if the DB server is local to the application.

7. The method of claim 1, wherein the application or database is deployed, managed or updated to end-users using application virtualisation software.

8. The method of claim 1, wherein the method allows the number of database servers, or the load on the or each database server required, to be reduced.

9. The method of claim 1, wherein the method allows the load on the or each database server to be balanced or redirected in cases of fail-over.

10. The method of claim 1, wherein the Optimisation system is added to an existing database client application or database server, and the structure of the tables and/or files of the database running on the database server, are each substantially unchanged by the optimisation system.

11. The method of claim 1, wherein the optimisation system is not an integral part of the client application or the database server or bespoke coding to the client application or the database server.

12. The method of claim 1, wherein the optimisation system changes either the application/database or the database server, but not both.

13. The method of claim 1, wherein the optimisation system is implemented in software and includes a client application or a server application.

14. The method of claim 1, wherein the optimisation system is implemented in software and includes a client application and a server application.

15. The method of claim 1, wherein the optimisation system is implemented in hardware.

16. The method of claim 1, wherein the optimisation system is located between the application/database and the database server.

17. The method of claim 1, wherein the optimisation system is located on the application/database and/or the database server.

18. The method of claim 1, wherein the optimisation system includes multiple instances of individual optimisation systems that each provides optimisation services.

19. The method of claim 18, wherein the multiple instances include a chain or mesh of peers.

20. The method of claim 18 wherein the path through the multiple instances of individual optimisation systems is variable.

21. The method of claim 18, wherein the multiple instances of individual optimisation systems are able to communicate amongst themselves.

22. The method of claim 18, wherein the multiple instances of individual optimisation systems share diagnostics and performance information.

23. The method of claim 18, wherein the multiple instances of individual optimisation systems each understand where they are in the chain or mesh of peers between initiator and the server.

24. The method of claim 1, wherein the optimisation system can dynamically determine how effective or detrimental a specific rule is and can choose to vary the applied rules to find the optimum performance enhancement.

25. The method of claim 1, wherein the server is a SQL server.

26. The method of claim 1, wherein the data includes DBMS requests and responses.

27. The method of claim 1, wherein the optimisation system reduces the number of DBMS requests and/or responses.

28. The method of claim 1, wherein the rules are accessed through a rules engine.

29. The method of claim 28, wherein the rules engine decides when and how to apply rules.

30. The method of claim 1, wherein the rules define caching of queries.

31. The method of claim 1, wherein the rules define how to obtain diagnostic, performance, cached data, cachability information.

32. The method of claim 1, wherein the rules define how to configure other rules.

33. The method of claim 1, wherein the rules define peer to peer caching of queries.

34. The method of claim 1, wherein the rules define compression.

35. The method of claim 1, wherein the rules define encryption.

36. The method of claim 1, wherein the rules define predictive pre-fetching.

37. The method of claim 1, wherein the rules define string replacement.

38. The method of claim 1, wherein the rules define query batching.

39. The method of claim 1, wherein the rules define re-routing to specific database servers for load balancing or fail-over.

40. The method of claim 1, wherein the rules define re-routing to specific network paths for speed.

41. The method of claim 1, wherein the rules define request modification.

42. The method of claim 1, wherein the rules pre-validate requests.

43. The method of claim 1, wherein the rules define auditing and logging.

44. The method of claim 1, wherein the rules automatically tune, adapt or improve.

45. The method of claim 1, wherein the rules can be selectively enabled or disabled based on factors such as initiator and server addresses or locations, time of day, configuration, server load.

46. The method of claim 1, wherein the rules are applied at different points in the request/response stream.

47. The method of claim 1, wherein the rules are custom rules.

48. A method, comprising
providing multiple software applications accessible in an application store;
routing data between one or more of the multiple software applications and a database server, via a WAN such as the Internet, and through a data optimisation system that applies rules to:
predict portions of the data the database server is likely to provide to the each software application, the predicted portions based on a particular request by the each software application to the database server;
send the predicted portions to the each software application in advance of the particular request for the predicted portions of the data;
satisfy the particular request with the predicted portions of the data, the satisfying occurring remote to the database server, thereby speeding up interaction between the each software application and the database server.

49. The method of claim 48, wherein the software applications includes database client applications.

50. The method of claim 48, wherein the software applications are distributed to end users' PCs.

51. The method of claim 48, wherein the software applications are distributed to system integrators.

52. The method of claim 48, wherein the database server is cloud-based.

53. The method of claim 48, wherein the software applications are deployed, managed or updated to end-users using application virtualisation software.

54. A computer system including:
a remotely accessible database server;
an application or database connected over a network to the database server; and
an optimisation system wherein the optimisation system analyses data requests from the application or database and applies rules to the data, the rules configured to:
predict portions of the data the database server is likely to provide to the application or database, the predicted portions based on a particular request by the application or database to the database server;
send the predicted portions to the application or database in advance of the particular request for the predicted portions of the data;
satisfy the particular request with the predicted portions of the data, the satisfying occurring remote to the database server, thereby speeding up interaction between the application or database and the database server.

55. A non-transitory computer readable media storing software defining an optimisation system to optimize the flow of data between an application or database and a database server, the optimisation system analysing the data and applying rules to the data to:
predict portions of the data the database server is likely to provide to application or database, the predicted portions based on a particular request by the application or database to the database server;
send the predicted portions of the data to the application or database in advance of the particular request for the predicted portions of the data;
satisfy the particular request with the predicted portions of the data, the satisfying occurring remote to the database server, thereby speeding up interaction between the application or database and the database server.

56. A method, comprising:
routing data between a file requestor and a file server through an optimisation system;
the optimisation system analysing the data and applying rules to the data to:
predict portions of the data the file server is likely to provide to file requestor, the predicted portions based on a particular request by the file requester to the file server;

send the predicted portions of the data to the file requester in advance of the particular request for the predicted portions of the data;

satisfy the particular request with the predicted portions of the data, the satisfying occurring remote to the file server, thereby speeding up interaction between the file requester and the file server.

57. A method, comprising:

routing data between a web data requestor and a web server through an optimisation system;

the optimisation system analysing the data and applying rules to the data to:

predict portions of the data the web server is likely to provide to web data requestor, the predicted portions based on a particular request by the web data requester to the web server;

send the predicted portions of the data to the web data requester in advance of the particular request for the predicted portions of the data;

satisfy the particular request with the predicted portions of the data, the satisfying occurring remote to the web server, thereby speeding up interaction between the web data requester and the web server.

* * * * *